United States Patent
Okada et al.

(10) Patent No.: US 10,012,885 B2
(45) Date of Patent: Jul. 3, 2018

(54) ELECTROCHROMIC DISPLAY DEVICE

(71) Applicants: Yoshinori Okada, Kanagawa (JP);
Yoshihisa Naijo, Kanagawa (JP);
Tohru Yashiro, Kanagawa (JP);
Shigenobu Hirano, Kanagawa (JP);
Hiroyuki Takahashi, Kanagawa (JP);
Toshiya Sagisaka, Kanagawa (JP);
Keiichiroh Yutani, Kanagawa (JP);
Sukchan Kim, Kanagawa (JP);
Kazuaki Tsuji, Kanagawa (JP);
Mamiko Inoue, Tokyo (JP); Tamotsu Horiuchi, Shizuoka (JP)

(72) Inventors: Yoshinori Okada, Kanagawa (JP);
Yoshihisa Naijo, Kanagawa (JP);
Tohru Yashiro, Kanagawa (JP);
Shigenobu Hirano, Kanagawa (JP);
Hiroyuki Takahashi, Kanagawa (JP);
Toshiya Sagisaka, Kanagawa (JP);
Keiichiroh Yutani, Kanagawa (JP);
Sukchan Kim, Kanagawa (JP);
Kazuaki Tsuji, Kanagawa (JP);
Mamiko Inoue, Tokyo (JP); Tamotsu Horiuchi, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/315,970

(22) PCT Filed: Jun. 30, 2015

(86) PCT No.: PCT/JP2015/003292
§ 371 (c)(1),
(2) Date: Dec. 2, 2016

(87) PCT Pub. No.: WO2016/002212
PCT Pub. Date: Jan. 7, 2016

(65) Prior Publication Data
US 2017/0131609 A1 May 11, 2017

(30) Foreign Application Priority Data

Jul. 1, 2014 (JP) .................. 2014-136142
Mar. 17, 2015 (JP) .................. 2015-053355
Jun. 19, 2015 (JP) .................. 2015-123915

(51) Int. Cl.
*G02F 1/01* (2006.01)
*G02F 1/15* (2006.01)
(Continued)

(52) U.S. Cl.
CPC .............. *G02F 1/1506* (2013.01); *G02F 1/01* (2013.01); *G02F 1/133345* (2013.01);
(Continued)

(58) Field of Classification Search
CPC .... G02F 1/01; G02F 1/133345; G02F 1/1506; G02F 1/1523; G02F 1/1525; G02F 1/155;
(Continued)

(56) References Cited

U.S. PATENT DOCUMENTS 4,832,463 A * 5/1989 Goldner ................ G02F 1/1525
359/270
7,029,833 B2 4/2006 Takahashi et al.
(Continued)

FOREIGN PATENT DOCUMENTS

JP 2008-180999 8/2008
JP 2011-164256 8/2011
(Continued)

OTHER PUBLICATIONS

International Search Report dated Sep. 15, 2015 for counterpart International Patent Application No. PCT/JP2015/003292 filed Jun. 30, 2015.
(Continued)

*Primary Examiner* — Loha Ben
(74) *Attorney, Agent, or Firm* — Cooper & Dunham LLP

(57) ABSTRACT

Provided is an electrochromic display device, including: a pair of electrodes facing each other; an electrochromic layer provided to one of the pair of electrodes: and an electrolytic
(Continued)

solution layer provided between the electrodes facing each other, wherein the electrochromic display device includes an yttrium-containing metal oxide layer between the electrochromic layer and the electrode to which the electrochromic layer is provided.

12 Claims, 4 Drawing Sheets

(51) Int. Cl.
*G02F 1/1333* (2006.01)
*G02F 1/155* (2006.01)
*G02F 1/153* (2006.01)
*G02F 1/163* (2006.01)

(52) U.S. Cl.
CPC .............. *G02F 1/155* (2013.01); *G02F 1/163* (2013.01); *G02F 1/1523* (2013.01); *G02F 2001/1536* (2013.01); *G02F 2001/1635* (2013.01); *G02F 2201/123* (2013.01)

(58) Field of Classification Search
CPC .. G02F 1/157; G02F 1/163; G02F 2001/1536; G02F 2001/1552; G02F 2001/1635; G02F 2201/123; H01M 10/0562
USPC ................................ 359/265, 269, 270, 275
See application file for complete search history.

(56) References Cited

U.S. PATENT DOCUMENTS

| 7,333,259 | B2 | 2/2008 | Hirano et al. |
|---|---|---|---|
| 7,474,322 | B2 | 1/2009 | Takahashi et al. |
| 7,830,584 | B2 | 11/2010 | Shibuya et al. |
| 7,880,955 | B2 | 2/2011 | Naijo et al. |
| 8,384,983 | B2 | 2/2013 | Yashiro et al. |
| 8,441,713 | B2 | 5/2013 | Kawashima et al. |
| 8,531,754 | B2 | 9/2013 | Fujimura et al. |
| 8,593,715 | B2 | 11/2013 | Yashiro et al. |
| 8,625,186 | B2 | 1/2014 | Okada et al. |
| 8,687,262 | B2 | 4/2014 | Yashiro et al. |
| 8,736,941 | B2 * | 5/2014 | Naijo .................... G02F 1/1523 359/265 |
| 8,743,048 | B2 * | 6/2014 | Takahashi ............... G02F 1/155 345/105 |
| 8,753,987 | B2 * | 6/2014 | Yukinobu ............. C03C 17/006 428/702 |
| 8,902,151 | B2 * | 12/2014 | Yashiro .................... G09G 3/38 345/105 |
| 8,937,758 | B2 | 1/2015 | Kim et al. |
| 9,091,895 | B2 * | 7/2015 | Bergh ..................... G02F 1/153 |
| 9,632,385 | B2 * | 4/2017 | Okada .................... G02F 1/155 |
| 9,829,762 | B2 * | 11/2017 | Takahashi ............. G02F 1/1523 |
| 2006/0204866 | A1 | 9/2006 | Hirano et al. |
| 2006/0215250 | A1 | 9/2006 | Shibuya et al. |
| 2008/0013152 | A1 | 1/2008 | Hirano et al. |
| 2009/0207476 | A1 | 8/2009 | Yanagisawa et al. |
| 2009/0231663 | A1 | 9/2009 | Hirano et al. |
| 2009/0231664 | A1 | 9/2009 | Shibuya et al. |
| 2012/0050838 | A1 | 3/2012 | Hirano et al. |
| 2012/0139824 | A1 | 6/2012 | Takahashi et al. |
| 2013/0258439 | A1 | 10/2013 | Naijo et al. |
| 2014/0043667 | A1 | 2/2014 | Bergh et al. |
| 2014/0078569 | A1 | 3/2014 | Takahashi et al. |
| 2014/0268284 | A1 | 9/2014 | Naijo et al. |
| 2015/0168796 | A1 | 6/2015 | Yashiro et al. |
| 2015/0198857 | A1 | 7/2015 | Yashiro et al. |

FOREIGN PATENT DOCUMENTS

| JP | 5007520 | 6/2012 |
|---|---|---|
| JP | 2012-128217 | 7/2012 |
| JP | 2012-137736 | 7/2012 |
| JP | 2012-194412 | 10/2012 |

OTHER PUBLICATIONS

N. Kobayashi et al., Proceeding of IDW' 04,1753(2004).
European search report dated Jan. 31, 2018 in connection with European patent application No. 15815975.6.

* cited by examiner

[Fig. 1]
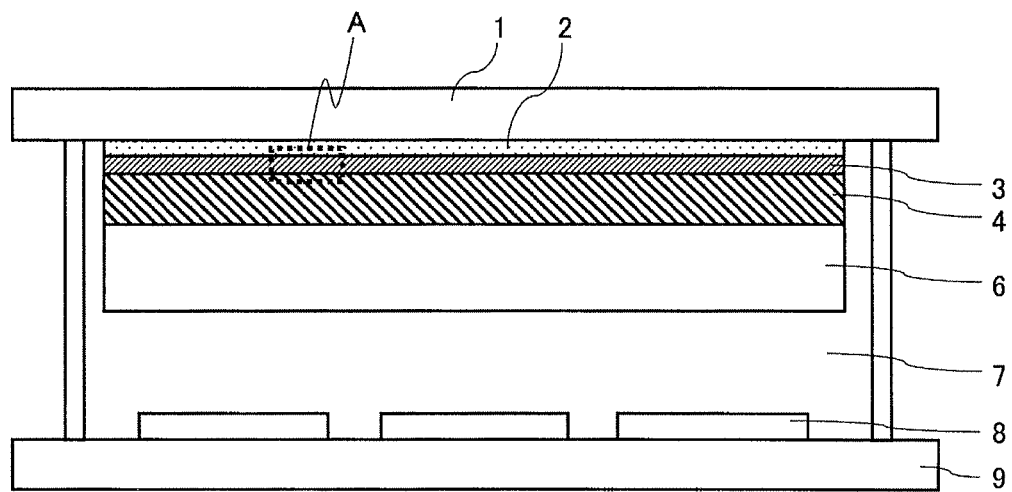
[Fig. 2]
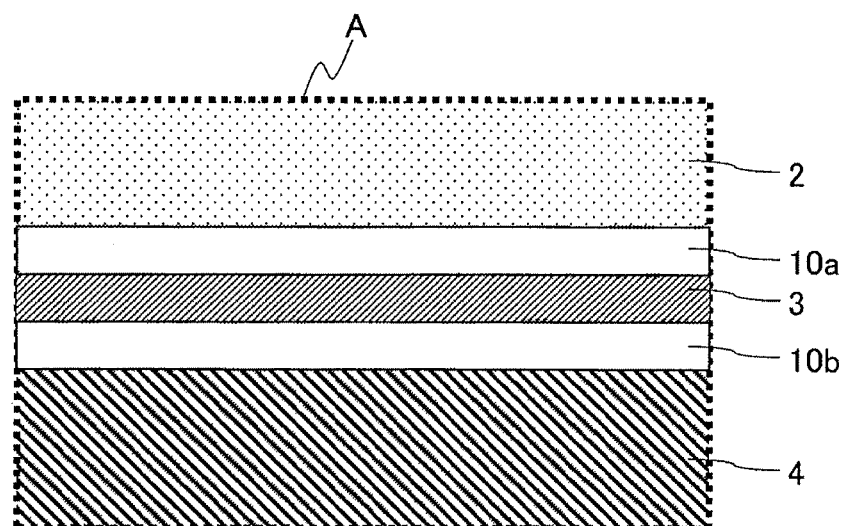

[Fig. 3]
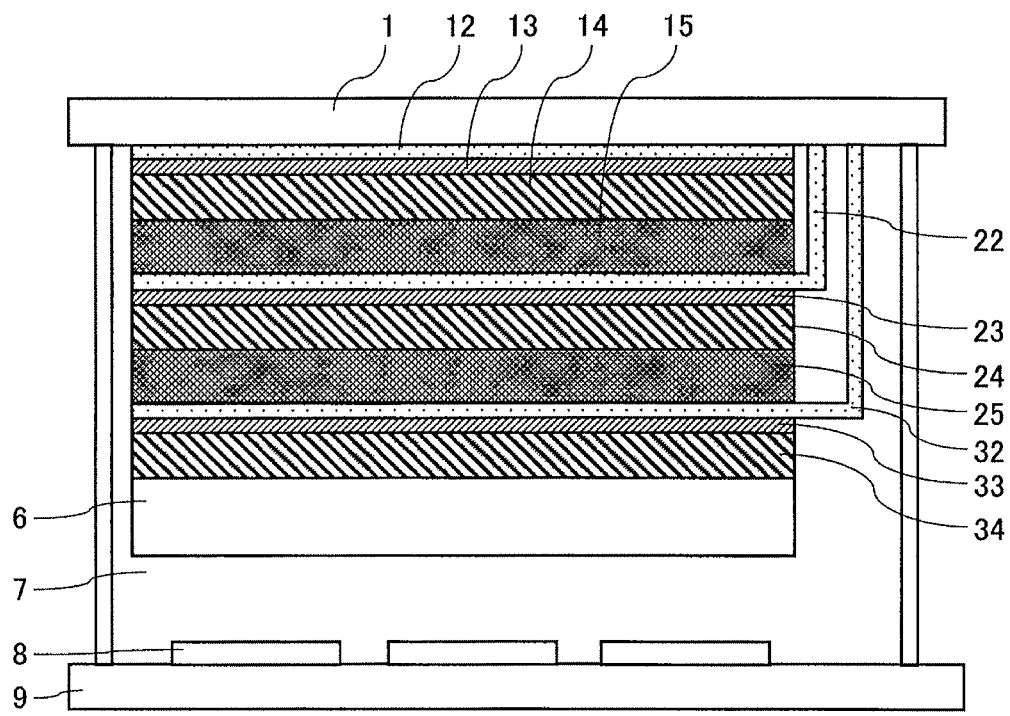
[Fig. 4]
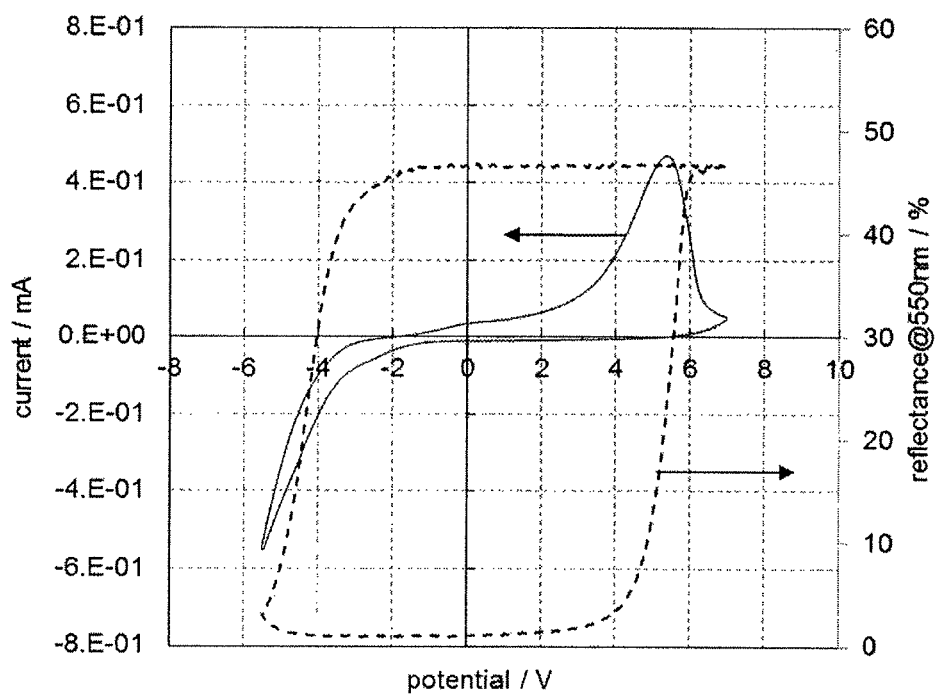

[Fig. 5]
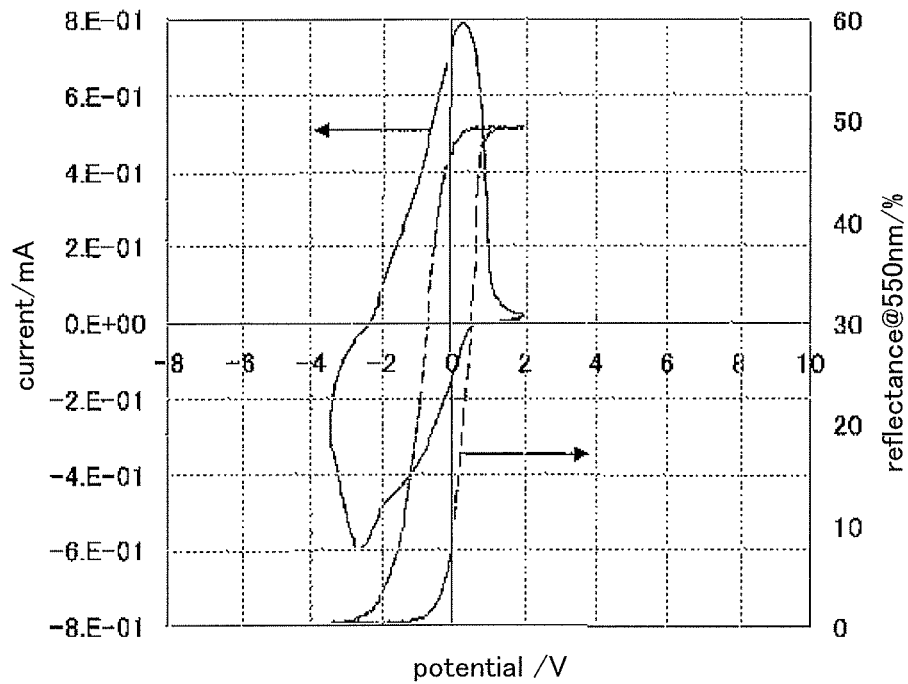
[Fig. 6]
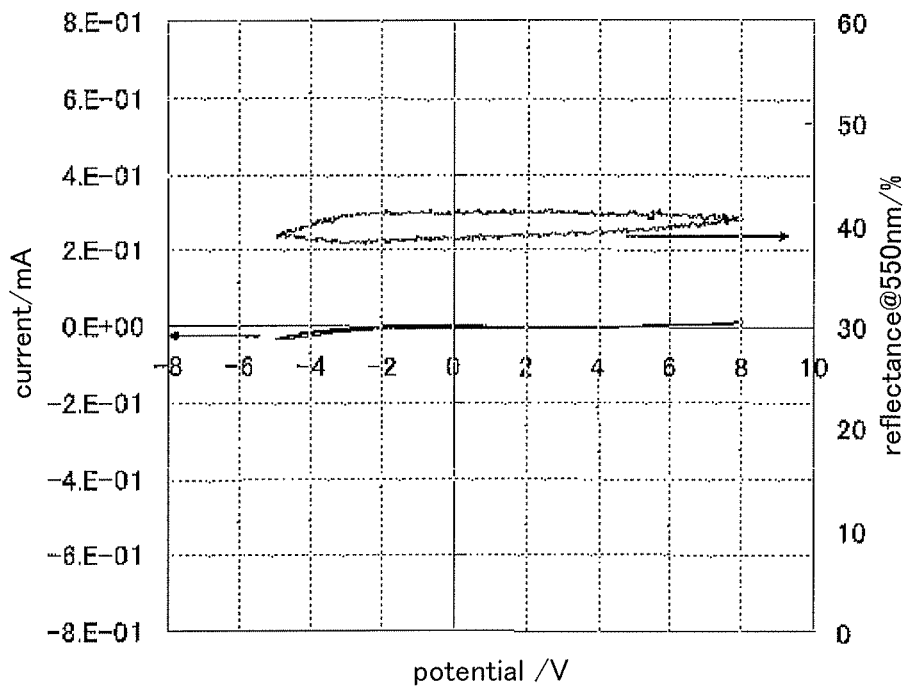

[Fig. 7]
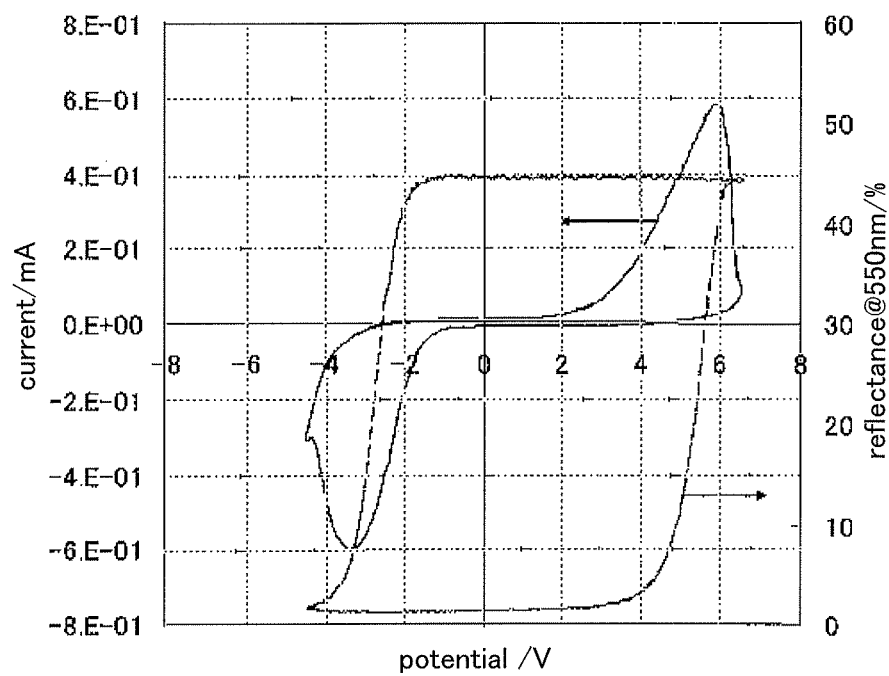

ELECTROCHROMIC DISPLAY DEVICE

TECHNICAL FIELD

The present invention relates to an electrochromic display device.

BACKGROUND ART

In recent years, there are increasing needs for electronic paper, which is an electronic medium to replace paper, and development activities for electronic paper are flourishing. As a means for realizing display systems for such electronic paper, self-luminescent display techniques such as liquid crystal displays and organic EL displays have been developed, and some of them have been commercialized. Meanwhile, reflective display techniques that are low power consumptive and excellent in visibility are seen as promising display techniques for the next-generation electronic paper.

A widely known reflective display technique is an electrophoretic system configured to inverse the positions of electrically charged white and black particles with an electric field and switch white and black display positions, and this system is employed in electronic book readers, etc. However, conventional techniques are limited to monochrome display, and full-color reflective display techniques are highly demanded. In this connection, as such a full-color reflective display technique, there is known a full-color display system that realizes color display with RGB (W) color filters overlaid over the monochrome electrophoretic system. However, there has been a problem that color vividness and brightness are poor because a space is divided by three or four colors.

Hence, as a promising technique for realizing a reflective display element without color filters, an electrochromic display system that utilizes an electrochromism phenomenon is paid attention. An electrochromic display system can expect a high color reproducibility and a display memory property.

An electrochromism phenomenon is a phenomenon that a specific substance causes a reversible oxidation-reduction reaction upon application of a voltage and changes to various colors. An electrochromic display device is a display device utilizing color development and color fading (hereinafter, referred to as color development and fading) of an electrochromic compound that causes such an electrochromism phenomenon.

Research and development for such electrochromic display devices are conducted from a wide variety of aspects from material development to device designing, because they are an important candidate for a display device technique for electronic paper for the reasons that they can produce various colors by engineering of the molecules of an organic electrochromic compound, that they are reflective display devices, that they have a display memory property, that they can be driven at a low voltage, etc.

Electrochromic display devices are expected as multicolor display devices because they can produce various colors depending on the structure of the electrochromic compound. Electrochromic display devices are one of electrochemical elements that apply a current typically across a pair of electrodes facing each other and utilize a color development reaction due to an oxidation-reduction reaction of an electrochromic compound provided between the electrodes. In order to realize a vivid full-color display, they need to have a structure in which three primary colors, namely yellow, cyan, and magenta are overlaid based on a subtractive color mixing method. As an example of this, a full-color display technique (multi-color display technique) based on overlaying of three element layers for yellow, cyan, and magenta has been reported (see PTL 1).

As the multi-color display technique, there are proposed configurations in which a plurality of display electrode layers and electrochromic color development layers are stacked over one display substrate (see PTLs 1 to 4). Further, there are proposed electrochromic display devices that use active-matrix TFTs as counter electrodes facing display electrodes (see PTLs 1 and 2). These proposals are characterized in that the plurality of display electrodes need not be finely patterned, and that a full-color display image can be obtained at a high aperture ratio with three display electrodes switched by one active-matrix TFT panel.

However, in these proposals, the plurality of display electrodes are common to the respective pixels, which leads to crosstalk between the pixels (color blurring and resolution degradation) resulting in blurring of a display image, and to crosstalk between the plurality of display electrodes (color mixing between the plurality of layers) resulting in a problem in a display image retention property. That is, the problem is intra-layer and inter-layer crosstalk.

Further, as a method for suppressing occurrence of crosstalk between pixels of a passive matrix driven electrochromic display device, there are proposed configurations in which a nickel oxide layer is provided between a display electrode and an electrochromic layer (see PTLs 3 and 4). There is also proposed a technique for shifting a response voltage from an electrochromic layer, by means of a diode structure formed by stacking a layer of titanium oxide known to be an n-type semiconductor and a layer of nickel oxide known to be a p-type semiconductor (see PTL 4).

However, a nickel oxide layer from which semiconductor properties can be obtained has a black color, which is a factor of reducing display qualities such as color vividness and brightness. Hence, improvement in the optical properties of the nickel oxide layer itself is demanded.

CITATION LIST

Patent Literature

[PTL 1]
Japanese Patent Application Laid-Open (JP-A) No. 2012-128217
[PTL 2]
JP-A No. 2012-137736
[PTL 3]
Japanese Patent (JP-B) No. 5007520
[PTL 4]
JP-A No. 2008-180999

Non-Patent Literature

[NPL 1]
N. Kobayashi et al., Proceeding of IDW' 04, 1753 (2004)

SUMMARY OF INVENTION

Technical Problem

An object of the present invention is to provide an electrochromic display device that can suppress crosstalk between pixels, and is excellent in a display image retention property and light resistance.

Solution to Problem

To solve the problems described above, an electrochromic display device of the present invention includes:
a pair of electrodes facing each other:
an electrochromic layer provided to one of the pair of electrodes; and
an electrolytic solution layer provided between the electrodes facing each other,
wherein the electrochromic display device includes a metal oxide layer that contains yttrium, and the metal oxide layer is between the electrochromic layer and the electrode to which the electrochromic layer is provided.

Advantageous Effects of Invention

The present invention can provide an electrochromic display device that can suppress crosstalk between pixels, and is excellent in a display image retention property and light resistance.

BRIEF DESCRIPTION OF DRAWINGS

FIG. 1 is an exemplary diagram showing an example of an electrochromic display device according to the present invention.

FIG. 2 is an exemplary diagram of an example of an electrochromic display device according to the present invention, showing an enlarged view of a main part.

FIG. 3 is an exemplary diagram showing another example of an electrochromic display device according to the present invention.

FIG. 4 is a diagram showing an example of a result of CV measurement of an electrochromic display device and reflectance change.

FIG. 5 is a diagram showing another example of a result of CV measurement of an electrochromic display device and reflectance change.

FIG. 6 is a diagram showing another example of a result of CV measurement of an electrochromic display device and reflectance change.

FIG. 7 is a diagram showing another example of a result of CV measurement of an electrochromic display device and reflectance change.

DESCRIPTION OF EMBODIMENTS

An electrochromic display device according to the present invention will be described below with reference to the drawings. The present invention is not limited to the embodiment described below, but other embodiments, additions, modifications, deletions, etc. can be made in the present invention within the conceivable scope of the persons skilled in the art. Any mode in which the functions and effects of the present invention are exerted is included within the scope of the present invention.

In the embodiment below, a case in which one of a pair of electrodes is composed of a display substrate and a display electrode provided over the display substrate, and the other of the electrodes is composed of; a counter substrate provided to face the display substrate; and a counter electrode provided over the counter substrate will be described as an example. However, a pair of electrodes of the present invention are not limited to those above.

First Embodiment

An embodiment of an electrochromic display device according to the present invention will be described. The electrochromic display device according to the present embodiment is shown in FIG. 1 and FIG. 2. FIG. 2 is an exemplary diagram showing an enlarged view of a main part of FIG. 1.

The electrochromic display device according to the present embodiment includes a display substrate, a display electrode provided over the display substrate, an electrochromic layer provided over the display electrode, a counter substrate provided to face the display substrate, a plurality of counter electrodes provided over the counter substrate, and an electrolytic solution layer provided between the display substrate and the counter substrate, and also includes a metal oxide layer that contains yttrium (yttrium-containing metal oxide layer). The metal oxide layer is between the display electrode and the electrochromic layer.

FIG. 1 shows the display substrate 1, the display electrode 2, the yttrium-containing metal oxide layer 3, the electrochromic layer 4, a white reflection layer 6, the electrolytic solution layer 7, the counter electrodes 8, and the counter substrate 9. The yttrium-containing metal oxide layer may hereinafter be referred to as "yttrium-containing layer". As shown in FIG. 1, the display substrate 1 and the counter substrate 9 face each other, and the display electrode 2, the yttrium-containing layer 3, the electrochromic layer 4, and the white reflection layer 6 are formed over the display substrate 1. The plurality of counter electrodes 8 are formed over the counter substrate 9, and the gap between the display substrate 1 and the counter substrate 9 is impregnated with an electrolytic solution in which an electrolyte is dissolved, to form the electrolytic solution layer 7.

FIG. 2 shows an exemplary diagram of an enlarged view of a portion A of FIG. 1 that is surrounded by a dotted line. Metal oxide layers 10a and 10b containing titanium oxide as a main component are formed above and below the yttrium-containing layer 3. Like this, it is preferable that the yttrium-containing layer 3 be formed between metal oxide layers containing titanium oxide as a main component.

Each structural elements of the electrochromic display device according to the first embodiment will be described below in detail.

<Display Substrate>

The display substrate 1 is not particularly limited except that it should be a transparent material, and an arbitrary display substrate may be selected according to the purpose. Examples thereof include a glass substrate, and a plastic film. The display substrate 1 may be coated with a transparent insulating layer and an antireflective layer over the external and internal surfaces thereof, in order to have better water vapor barrier property, gas barrier property, and visibility.

<Display Electrode>

The display electrode 2 is not particularly limited except that it should be a material having transparency and conductivity, and an arbitrary display electrode may be selected according to the purpose.

Examples of the material of the display electrode 2 include metal oxides such as indium oxide, zinc oxide, tin oxide, indium-tin-oxide (ITO), and indium-zinc-oxide. The display electrode may also be a network electrode made of silver nanowire, gold nanowire, carbon nanotube, metal oxide, or the like that has transparency, or may be a composite layer in which these materials are combined.

Examples of the method for producing the display electrode 2 include vacuum vapor deposition, sputtering, and ion plating.

When the material of the display electrode 2 is a coatable material, various printing methods such as spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing may be used.

Optical transmittance of the display electrode 2 is not particularly limited, and may be appropriately selected according to the purpose. However, it is preferably 60% or higher but lower than 100%, and more preferably 90% or higher but lower than 100%. When the optical transmittance is lower than 60%, troubles occur that the display properties such as brightness and color vividness are poor, and a display image is dark. The film thickness of the display electrode 2 is not particularly limited, but is preferably from 10 nm to 300 nm when it is an ITO electrode. Surface resistivity of the display electrode 2 is an important element that influences the display properties of the electrochromic display device, such as response speed and display uniformity. The display resistivity of the display electrode 2 is preferably 100Ω/□ or lower, and more preferably 10Ω/□ or lower, although it depends on an electrochromic display area.

<Counter Substrate and Counter Electrodes>

The counter substrate 9 may be transparent or opaque. Various types of substrates may be used as the counter substrate, including a glass substrate and a plastic film substrate when it is a transparent substrate, a silicon substrate and a metal substrate such as stainless when it is an opaque substrate, and a laminate in which these are layered.

In the electrochromic display device according to the present embodiment, the counter electrodes 8 function as pixel electrodes.

The material of the counter electrodes 8 is not particularly limited except that it should be a material having conductivity, and an arbitrary material may be selected according to the purpose. For example, metal oxide such as indium oxide, zinc oxide, tin oxide, indium tin oxide, and indium zinc oxide, metal such as zinc and platinum, and carbon, or a composite film in which these materials are combined may be used.

The film thickness of the counter electrodes 8 is not particularly limited, but is preferably from 10 nm to 5 μm.

A protective layer may be formed to cover the counter electrodes 8 in order to protect the counter electrodes 8 from being irreversibly corroded due to an oxidation-reduction reaction.

The counter electrodes 8 need to be formed for each pixel divisionally. Therefore, the method for producing the counter electrodes may be a combination of a film formation method such as vacuum vapor deposition, sputtering, and ion plating, and various patterning techniques such as a shadow mask technique, a photolithography technique, and a lift-off technique.

When the material of the counter electrodes 8 is a coatable material, various printing methods such as spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing may be used. Any of these methods that is incapable of pattern forming may be combined with the various patterning techniques described above, which makes it possible to form the counter electrodes 8 in a favorable fashion.

The counter electrodes 8 formed over the counter substrate 9 function as pixel electrodes of the electrochromic display device. Therefore, it is preferable that the counter substrate 9 and the counter electrodes 8 be composed of a matrix display substrate over which pixel electrodes and a drive circuit are formed. For example, an active-matrix device and a passive-matrix device used for dot matrix display may be used. Among such devices, an active-matrix TFT using a TFT (Thin Film Transistor) can be used favorably.

As an active layer of the active-matrix TFT, a silicon semiconductor such as amorphous silicon and polysilicon, an oxide semiconductor such as indium-gallium-zinc oxide (IGZO), a carbon semiconductor such as graphene and carbon nanotube, and an organic semiconductor such as pentacene may be used. Among these, a low-temperature polysilicon TFT and an IGZO-TFT having a relatively high mobility can be used favorably.

<<Protective Layer Covering Counter Electrodes>>

The material of the above described protective layer for covering the counter electrodes 8 is not particularly limited except that it should be able to fulfill the role of preventing corrosion of the counter electrodes 8 due to an irreversible oxidation-reduction reaction. Various materials including as $Al_2O_3$ and $SiO_2$ or an insulating material containing these, zinc oxide and titanium oxide or a semiconductor material containing these, and an organic material such as polyimide may be used. Among these, a material that exhibits a reversible oxidation-reduction reaction is preferable.

As the protective layer, there is known one that is obtained by fixing particles of a conductive or semi-conductive metal oxide such as antimony tin oxide and nickel oxide over the counter electrodes 8 with a binder resin (binder) such as acrylic-based, alkyd-based, isocyanate-based, urethane-based, epoxy-based, or phenol-based resin.

Examples of the method for forming the protective layer include vacuum vapor deposition, sputtering, and ion plating. When the material of the protective layer is a coatable material, various printing methods such as spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing may be used.

The thickness of the protective layer is not particularly limited, but is preferably from 50 nm to 5 μm.

<Electrochromic Layer>

The electrochromic layer 4 includes a porous electrode made of conductive particles or semi-conductive particles, and an electrochromic material that is supported on the particles and exhibits a color developing change by an oxidation-reduction reaction.

The electrochromic material may be an inorganic electrochromic compound or an organic electrochromic compound. A conductive polymer known to exhibit electrochromism may also be used.

Examples of the inorganic electrochromic compound include tungsten oxide, molybdenum oxide, iridium oxide, and titanium oxide.

Examples of the organic electrochromic compound include a viologen derivative, a rare earth phthalocyanine derivative, and a styryl derivative.

Examples of the conductive polymer include polypyrrole, polythiophene, and polyaniline, or derivatives thereof.

It is preferable that the electrochromic layer 4 have a structure in which an organic electrochromic compound is supported on conductive or semi-conductive particles. Specifically, a structure obtained by sintering particles having a particle diameter of from about 5 nm to 50 nm over the surface of the electrode, and chemically adsorbing an organic electrochromic compound having a polar group such as a phosphonic acid group, a carboxyl group, and a silanol group to the surface of the particles is preferable. Such a structure enables electrons to be injected into the organic electrochromic compound efficiently by way of a high surface effect of the particles, leading to a faster response than conventional electrochromic display devices.

Furthermore, use of particles enables a transparent film to be formed as a display layer. This makes it possible for the electrochromic compound to exhibit its high color optical density. Note that a plurality of kinds of organic electrochromic compounds may be supported on conductive or semi-conductive particles.

Specific examples will be shown below in a non-limiting manner. As a polymer-based or pigment-based electrochromic compound, a low-molecular-weight organic electrochromic compound (e.g., azobenzene-based, anthraquinone-based, diarylethene-based, dihydroprene-based, dipyridine-based, styryl-based, styrylspiropyran-based, spirooxazine-based, spirothiopyran-based, thioindigo-based, tetrathiafulvalene-based, terephthalic acid-based, triphenyl-methane-based, triphenylamine-based, naphthopyran-based, viologen-based, pyrazoline-based, phenazine-based, phenylenediamine-based, phenoxazine-based, phenothiazine-based, phthalocyanine-based, fluoran-based, fulgide-based, benzopyran-based, and metallocene-based compounds), and a conductive polymer compound (e.g., polyaniline, and polythiophene) may be used. Among these, a viologen-based compound and a dipyridine-based compound are preferable because they develop or fade a color at a low potential, and exhibit a favorable color value even in a configuration in which there are a plurality of display electrodes. Examples of the viologen-based compound are presented in, e.g., JP-B No. 3955641 and JP-A No. 2007-171781. Examples of the dipyridine-based compound are presented in, e.g., JP-A Nos. 2007-171781 and 2008-116718.

Among these, a dipyridine-based compound represented by the general formula (1) below is particularly preferable. Since these materials develop or fade a color at a low potential, they exhibit a favorable color value of color development at a reduction potential even in an electrochromic display device configured to have a plurality of display electrodes.

[Chem. 1]

General Formula (1)

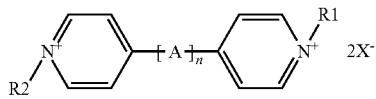

In the general formula (1) above, R1 and R2 each independently represent an alkyl group or an aryl group that has 1 to 8 carbon atoms and may have a substituent. It is preferable that R1, or R2, or both thereof have a substituent selected from the group consisting of COOH, PO(OH)$_2$, and Si(OC$_k$H$_{2k+1}$)$_3$.

n represents 0, 1, or 2. k represents 0, 1, or 2.

X represents a monovalent anion. The monovalent anion is not particularly limited except that it should be able to form a stable pair with a cationic moiety, and an arbitrary monovalent anion may be selected according to the purpose. Examples thereof include a Br ion (Br$^-$), a Cl ion (Cl$^-$), a ClO$_4$ ion (ClO$_4^-$), a PFG ion (PF$_6^-$), and a BF$_4$ ion (BF$_4^-$) ion.

A represents an alkylene group, an arylene group, or a heterocyclic group that has 1 to 20 carbon atoms and may have a substituent.

Meanwhile, as a metal complex-based or metal oxide-based electrochromic compound, an inorganic electrochromic compound such as titanium oxide, vanadium oxide, tungsten oxide, indium oxide, iridium oxide, nickel oxide, and Prussian blue may be used.

<<Conductive or Semi-Conductive Particles on which Organic Electrochromic Compound is Supported>>

The conductive or semi-conductive particles are not particularly limited, and arbitrary particles may be selected according to the purpose. However, metal oxide is preferable.

As the metal oxide, a metal oxide containing as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate acid, calcium phosphate, or aluminosilicate may be used. These metal oxides may be used alone, or two or more kinds may be used as a mixture. Among these, one kind selected from the group consisting of titanium oxide, zinc oxide, tin oxide, zirconium oxide, iron oxide, magnesium oxide, indium oxide, and tungsten oxide, or a mixture of these enables a multi-color display excellent in a response speed of color development and fading, owing to their electric properties such as electric conductivity, and their physical properties such as optical properties. Above all, titanium oxide enables a multi-color display more excellent in a response speed of color development and fading.

The shape of the conductive or semi-conductive particles is not particularly limited, and may be appropriately selected according to the purpose. However, a shape having a large surface area per unit volume (hereinafter, may be referred to as "specific surface area") is used in order to support the electrochromic compound efficiently. For example, when the particles are an agglomerate of nanoparticles, they have a large specific surface area, and can support the electrochromic compound more efficiently, which enables a multi-color display excellent in a display contrast ratio between color development and fading.

The thickness of the electrochromic layer 4 is not particularly limited, but is preferably from 50 nm to 5 μm.

<Yttrium-Containing Metal Oxide Layer>

The electrochromic display device according to the present embodiment includes a metal oxide layer containing yttrium (referred to as yttrium-containing layer) between the display electrode 2 and the electrochromic layer 4. That is, the yttrium-containing layer 3 contains at least yttrium oxide.

As described above, it is preferable that the yttrium-containing layer 3 be formed between the metal oxide layers 10a and 10b containing titanium oxide as a main component (FIG. 2). Such a configuration facilitates control of the color development/fading potential of the electrochromic layer, and enables a bright and vivid display without degradation of display properties. The metal oxide layers containing titanium oxide as a main component may hereinafter be referred to as "titanium oxide-containing layers", and both address terms represent the same thing. The titanium oxide-containing layers 10a and 10b contain titanium oxide as a main component, and may be formed by sputtering, or the like.

A content of titanium oxide in the titanium oxide-containing layers is preferably from 50 mol % to 100 mol %, and more preferably from 50 mol % to 90 mol %. When the content is greater than 100 mol %, productivity of RF sputtering may drop due to an abnormal electrical discharge.

The thickness of the titanium oxide-containing layers is not particularly limited, but is preferably from 1 nm to 100 nm.

Yttrium is known to produce a composite oxide called garnet together with aluminum and iron. Garnet can also be used favorably. The yttrium-containing layer 3 may be a layer of titanium oxide, zinc oxide, tin oxide, zirconium oxide, cerium oxide, boron oxide, magnesium oxide, strontium titanate, potassium titanate, barium titanate, calcium titanate, calcium oxide, ferrite, hafnium oxide, tungsten oxide, copper oxide, nickel oxide, cobalt oxide, barium oxide, strontium oxide, or vanadium oxide, or a mixture layer containing two or more of these oxides.

Yttrium oxide has a band gap of about 6 eV, and stands as a barrier against charge injection from the display electrode 2 into the electrochromic layer 4. This provides an effect of shifting the threshold of the color development/fading potential of the electrochromic layer 4. The content of yttrium oxide in the yttrium-containing layer 3 is preferably 10 mol % or higher, more preferably 20 mol % or higher, and yet more preferably from 40 mol % to 100 mol %. When the content is less than 10 mol %, other elements become more influential, which may lead to a trouble that injection of charges into the electrochromic layer 4 cannot be suppressed, etc.

The thickness of the yttrium-containing layer 3 is not particularly limited, but is preferably from 1 nm to 50 nm. When the thickness is greater than 50 nm, the yttrium-containing layer may become an insulating resistance, and cause a trouble of inhibiting injection of charges from the display electrode into the electrochromic layer to raise the color development/fading potential excessively high.

The electrochromic display device of the present embodiment is composed of pairs between the display electrode 2 and the plurality of counter electrodes 8, and can drive some selective ones of the counter electrodes 8 and display a pattern corresponding to the driven counter electrodes 8 on the display electrode 2. A reduction reaction of electrochromic molecules occurs at the positions in the electrochromic layer 4 that face the driven counter electrodes 8, and a pattern is displayed as a result.

According to the conventional arts, the display electrode 2 and the electrochromic layer 4 are electrically continuous to each other between adjoining counter electrodes 8, which causes charges of a local reduction reaction to be released into the display electrode 2 and the electrochromic layer 4 with time, which diffuses the displayed image. The diffusion speed is dependent on the electric resistivity of the display electrode 2 and the electrochromic layer 4, and it has been discovered that diffusion through the display electrode 2 is very heavy.

As compared with this, when the yttrium-containing metal oxide layer 3 (yttrium-containing layer) is provided, there is a "barrier" for preventing charges from being released into the display electrode 2 from the electrochromic layer 4 that has caused a local reduction reaction. Hence, one of the effects of the present invention, i.e., suppression of bleeding of a display image to a portion of the electrochromic layer 4 that faces an adjoining counter electrode 8 (i.e., crosstalk between pixels) can be achieved, which makes it possible to obtain an electrochromic display device excellent in a display image retention property. Furthermore, use of yttrium provides an excellent light resistance without blackening, which is often the case when nickel is used.

<Electrolytic Solution Layer>

The electrolytic solution contained in the electrolytic solution layer 7 is composed of an electrolyte and a solvent for dissolving the electrolyte. The electrolytic solution may be impregnated into the display electrode 2 and layers produced on the display substrate 1 side of the electrochromic layer 4 during bonding of the display substrate 1 with the counter substrate 9.

Alternatively, the electrolyte may be distributed dispersedly in the display electrode 2 and the electrochromic layer 4 during the step of producing these layers, and only the solvent may be impregnated during bonding of the display substrate 1 with the counter substrate 9. With this method, the speed of impregnation into the respective layers can be improved by way of the osmotic pressure of the electrolytic solution.

As the electrolytic solution, a liquid electrolyte containing a molten salt, such as an ionic liquid, a solution obtained by dissolving a solid electrolyte in a solvent, etc. may be used.

As the material of the electrolyte, for example, an inorganic ionic salt such as an alkali metal salt and an alkaline-earth metal salt, a quaternary ammonium salt, and an acidic or alkaline supporting electrolytes may be used. Examples include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$. One of these may be used alone, or two or more of these may be used in combination.

The ionic liquid is not particularly limited, and publicly-known ionic liquids may be used. Above all, some organic ionic liquids have a molecular structure that is liquid in a wide temperature range including room temperature, and are preferable.

Examples of cationic components as the molecular structure include: imidazole derivative such as N,N-dimethylimidazole salt, N,N-methylethylimidazole salt, and N,N-methylpropylimidazole salt; salt of aromatic series such as pyridinium derivative (e.g., N, N-dimethylpyridinium salt, and N,N-methylpropylpyridinium salt); and an aliphatic quaternary ammonium-based compound such as tetraalkylammonium (e.g., trimethylpropylammonium salt, trimethylhexylammonium salt, and triethylhexylammonium salt). Preferable anionic components as the molecular structure are compounds containing fluorine in terms of stability under atmospheric conditions, and examples include $BF_4^-$, $CF_3SO_3^-$, $PF_4^-$, and $(CF_3SO_2)_2N^-$. An ionic liquid prescribed based on any combination of these cationic components and anionic components may be used.

Examples of the solvent include propylene carbonate, acetonitrile, γ-butyrolactone, ethylene carbonate, sulfolane, dioxolan, tetrahydrofuran, 2-methyl tetrahydrofuran, dimethyl sulfoxide, 1,2-dimethoxyethane, 1,2-ethoxymethoxyethane, polyethylene glycol, and alcohols. One of these may be used alone, or two or more of these may be used in combination.

The electrolytic solution needs not be a low-viscosity liquid, but may be in any form such as a gel form, a polymeric cross-linked form, and a dispersed form in a liquid crystal. The electrolytic solution is preferably in a gel form and a solid form, in terms of improvement of element strength, improvement of reliability, and prevention of color development diffusion.

A solidifying method is not particularly limited, but it is preferable to hold the electrolyte and the solvent in a polymer resin, because this makes it possible to obtain a high ionic conductivity and solid strength. The polymer resin is preferably a photocurable resin, because this makes it possible to produce an element at a lower temperature and in a shorter time than by a method for forming a thin film by thermal polymerization or vaporization of a solvent.

<White Reflection Layer>

The white reflection layer 6 can be produced by, for example, a method of coating a resin in which white pigment particles are dispersed.

The material of the white pigment particles contained in the white reflection layer 6 is not particularly limited, and an arbitrary material may be selected according to the purpose. Examples thereof include titanium oxide, aluminum oxide, zinc oxide, silica, cesium oxide, and yttrium oxide.

As the resin in which the white pigment particles are dispersed, for example, various polymeric resin materials such as an epoxy resin, a phenol resin, a urethane resin, a polyimide resin, an acrylic resin, and a polyamide resin may be used.

As the method for forming the white reflection layer 6, various printing methods such as spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing may be used.

The thickness of the white reflection layer 6 is not particularly limited, but is preferably from 1 µm to 20 µm.

Second Embodiment

Next, other embodiments of the electrochromic display device according to the present invention will be described. Description of any matters that are the same as in the embodiment described above will be skipped. FIG. 3 shows an exemplary diagram of an electrochromic display device according to the present embodiment.

The electrochromic display device according to the present embodiment includes a display substrate, a plurality of display electrodes provided over the display substrate and provided over different planes respectively, a plurality of electrochromic layers provided over the plurality of display electrodes respectively, a counter substrate provided to face the display substrate, counter electrodes formed over the counter substrate, and an electrolytic solution layer provided between the display substrate and the counter substrate, and also includes a metal oxide layer that contains yttrium (an yttrium-containing metal oxide layer). The metal oxide layer is at at least one portion between the plurality of display electrodes and the plurality of electrochromic layers.

It is preferable that insulating layers be provided between the plurality of display electrodes and the counter electrodes, respectively.

As shown in FIG. 3, the electrochromic display device according to the present embodiment includes the display substrate 1 and the counter substrate 9 facing each other.

A first display electrode 12, a first yttrium-containing metal oxide layer 13, and a first electrochromic layer 14 are formed at a side closer to the display substrate 1. A first insulating layer 15 is formed over the first electrochromic layer 14.

A second display electrode 22 is formed over the first insulating layer 15, and a second yttrium-containing metal oxide layer 23 and a second electrochromic layer 24 are formed over the second display electrode 22. A second insulating layer 25 is formed over the second electrochromic layer 24.

A third display electrode 32 is formed over the second insulating layer 25, and a third yttrium-containing metal oxide layer 33 and a third electrochromic layer 34 are formed over the third display electrode 32. A white reflection layer 6 is formed over the third electrochromic layer 34.

A plurality of counter electrodes 8 are formed over a surface of the counter substrate 9. It is preferable that insulating layers be provided between the plurality of display electrodes and counter electrodes 8 respectively, like this. An electrolytic solution layer 7 is formed between the display substrate 1 and the counter substrate 9.

The first, second, and third yttrium-containing metal oxide layers may hereinafter be referred to as first, second, and third yttrium-containing layers, respectively. The second and third electrochromic layers may be referred to as intermediate electrochromic layers, and the second and third display electrodes may be referred to as intermediate display electrodes.

<Yttrium-Containing Metal Oxide Layer>

The same yttrium-containing layer as in the first embodiment may be used as the yttrium-containing layer of the present embodiment.

In the present embodiment, it is only necessary that the yttrium-containing layer be provided at at least one portion between the plurality of display electrodes and electrochromic layers. That is, in FIG. 3, it is only necessary that any one of the first yttrium-containing layer 13, the second yttrium-containing layer 23, and the third yttrium-containing layer 33 be provided. In the present embodiment, it is preferable that two of these yttrium-containing layers be provided, and it is more preferable that three of these be provided. That is, it is preferable that yttrium-containing layers be provided in all gaps between the plurality of display electrodes and electrochromic layers, which makes it possible to suppress intra-layer and inter-layer crosstalk better.

In the electrochromic display device of the present embodiment, it is preferable that the yttrium-containing layers be formed between metal oxide layers containing titanium oxide as a main component, as in the electrochromic display device of the first embodiment. Note that the metal oxide layers containing titanium oxide as a main component will be referred to as titanium oxide-containing layers, as described above. By the yttrium-containing layers being formed between the titanium oxide-containing layers, it is possible to display a bright and vivid image without spoiling display qualities even when a plurality of electrochromic layers 4 are stacked.

In the present embodiment, it is preferable that first and second titanium oxide-containing layers be formed above and below the first yttrium-containing layer 13, and that the first titanium oxide-containing layer, the first yttrium-containing layer 13, and the second titanium oxide-containing layer be overlaid in this order, although not illustrated so.

As for the second yttrium-containing layer 23 likewise, it is preferable that third and fourth titanium oxide-containing layers be formed above and below the second yttrium-containing layer 23, and that the third titanium oxide-containing layer, the second yttrium-containing layer 23, and the fourth titanium oxide-containing layer be overlaid in this order. Furthermore, as for the third yttrium-containing layer 33 likewise, it is preferable that fifth and sixth titanium oxide-containing layers be formed above and below the third yttrium-containing layer 33, and that the fifth titanium oxide-containing layer, the third yttrium-containing layer 33, and the sixth titanium oxide-containing layer be overlaid in this order.

The same titanium oxide-containing layers as used in the first embodiment may be used as these titanium oxide-containing layers. It is not indispensable to form all of the first to sixth titanium oxide-containing layers. However, it is preferable to form the first to sixth titanium oxide-containing layers.

The electrochromic display device of the present embodiment includes a plurality of electrochromic layers, and can hence realize a multi-color display. FIG. 3 shows an example in which there are three electrochromic layers. However, this is not limiting, and there may be three or more electrochromic layers. In this case, it is only necessary that an yttrium-containing layer, an electrochromic layer, and an insulating layer be formed in this order over a display electrode.

<Intermediate Display Electrode>

In the present invention, among the plurality of display electrodes, those display electrodes other than the first display electrode 12, which contacts the display substrate 1, may be referred to as intermediate display electrodes. That is, in the present embodiment, the second display electrode 22 and the third display electrode 32 may be referred to as intermediate display electrodes. The same display electrode as the display electrode 2 described above may be used as the intermediate display electrodes, and it is preferable that the intermediate display electrodes be formed of a material having transparency and conductivity. In the present embodiment, the intermediate display electrodes have at least ion permeability. Among the intermediate display electrodes formed by a vacuum film formation method or various printing methods, those that have a poor ion permeability may be provided with minute through holes, which makes it possible to compensate for the ion permeability.

Publicly-known formation methods may be used as a method for providing minute through holes in the intermediate display electrode.

(1) A method of forming a layer having undulations as an underlayer before forming the intermediate display electrode, and using the resultant as an intermediate display electrode having undulations.

(2) A method of forming projecting structures such as micropillars before forming the intermediate display electrode, and removing the projecting structures after forming the display electrode.

(3) A method of dispersing a foamable high molecular weight polymer or the like before forming the intermediate display electrode, and foaming the polymer by heating, deaeration, or any such treatments after forming the intermediate display electrode.

(4) A method of forming minute holes directly in the intermediate display electrode by irradiation of various types of radioactive rays.

The pore diameter of the minute through holes formed in the intermediate display electrode is preferably from 0.01 μm to 100 μm, and more preferably from 0.1 μm to 5 μm. When the pore diameter of the through holes is less than 0.01 μm, a trouble of reducing ion permeability may occur. When it is greater than 100 μm, the through holes have a size of a visible level (i.e., a size of one pixel electrode level in an ordinary display), and may cause a trouble in the display performance immediately above the minute through holes.

The ratio of pore areas of the minute through holes to the surface area of the intermediate display electrode (i.e., pore density) is not particularly limited, and may be appropriately selected according to the purpose. However, it is preferably from 0.01% to 40%, and more preferably from 20% to 40%. When the pore density is greater than 40%, the surface resistance of the intermediate display electrode is high, which may cause failures in color development/fading display due to the broadened area over which there is no intermediate display electrode. On the other hand, when the pore density is less than 0.01%, electrolytic ion permeability is poor, which may likewise cause a trouble in color development/fading display.

<Intermediate Electrochromic Layer>

In the present invention, among the plurality of electrochromic layers, those electrochromic layers other than the first electrochromic layer 14 may be referred to as intermediate electrochromic layers. That is, in the present embodiment, the second electrochromic layer 24 and the third electrochromic layer 34 may be referred to as intermediate electrochromic layers.

The first to third electrochromic layers may be formed by using the same material and method as those for the electrochromic layer 4 described above. It is preferable that the intermediate electrochromic layers have electrolytic solution ion permeability, and it is particularly preferable that like the electrochromic layer 4, the intermediate electrochromic layers have a structure in which an organic electrochromic compound is supported on conductive or semi-conductive particles.

It is preferable that the intermediate electrochromic layers be formed of an electrochromic compound that develops a color different from the first electrochromic layer 14. This enables a multi-color display. Further, it is preferable that the electrochromic compounds of the first to third electrochromic layers have similar molecular structures. Such a similarity enables the display electrode and the intermediate display electrodes to have a uniform color development/fading potential, and makes it possible to control color development and fading easily by the same electrolyte.

As described above, it is preferable that the display electrodes and the electrochromic layers have porosity and an optical transmission property. Above all, it is preferable that the intermediate display electrodes and electrochromic layers have porosity and an optical transmission property. Porosity may be appropriately selected according to the purpose, but it is preferable to adjust the pore diameter and pore density as follows.

The pore diameter of the minute through holes is preferably from 0.01 μm to 100 μm, and more preferably from 0.1 μm to 5 μm.

The ratio of pore areas of the minute through holes to the surface area of the intermediate display electrode (i.e., pore density) may be appropriately selected according to the purpose, but is preferably from 0.01% to 40%, and more preferably from 20% to 40%.

As for the optical transmission property, it is preferable to adjust the optical transmittance as follows.

Optical transmittance may be appropriately selected according to the purpose, but is preferably 60% or higher but lower than 100%, and more preferably 90% or higher but lower than 100%.

<Insulating Layer>

As described above, it is preferable that insulating layers be provided between the plurality of display electrodes and counter electrodes 8, respectively. In the present embodiment, a first insulating layer 15 and a second insulating layer 25 are illustrated. The first insulating layer 15 or the second insulating layer 25 is configured to separate the first display electrode 12 and the second display electrode 22 from each other, or the second display electrode 22 and the third display electrode 32 from each other, such that they are electrically insulated from each other.

It is necessary to form the first display electrode 12, the second display electrode 22, and the third display electrode 32 to be electrically insulated from each other, in order to control their potentials relative to the counter electrodes 8 independently. Insulation between the display electrodes can be controlled by means of the thickness of the electrochromic layers, but it is preferable that insulation between the display electrodes be controlled by formation of the insulating layers.

Further, although not illustrated in FIG. 3, when additionally providing a fourth display electrode and a fourth electrochromic layer, it is preferable to insert an insulating layer between adjoining intermediate display electrodes in order to compensate for the insulation between the intermediate display electrodes.

The material of the insulating layers is not particularly limited except that it should be porous, and a material having porosity and an optical transmission property is preferable. Further, an organic material, an inorganic material, or a composite body of these, each of which has a high insulation property, a high durability, and an excellent film formation property is preferable.

As a method for forming the insulating layers, publicly-known methods such as a sintering method (i.e., a method of adding polymer particles or inorganic particles to a binder or the like to fuse the particles partially, and utilizing the pores produced between the particles), an extraction method (i.e., a method of forming a matrix layer from an organic or inorganic material soluble in a solvent, and a binder or the like insoluble in the solvent, and then dissolving the organic or inorganic material with the solvent to produce pores), a foaming method of foaming a high molecular weight polymer by heating or deaeration, a phase inversion method of causing phase separation in a mixture of polymers by controlling a good solvent and a poor solvent, and a radiation exposure method of forming pores by radiation exposure may be used.

Specifically, a resin mixture particle film composed of metal oxide particles (e.g., $SiO_2$ particles, and $Al_2O_3$ particles) and a resin binding agent, a porous organic film (e.g., a polyurethane resin, and a polyethylene resin), and an inorganic insulation material film formed over a porous film can be used favorably.

The particle diameter of the metal oxide particles constituting the insulating layers is preferably from 5 nm to 300 nm, and more preferably from 10 nm to 80 nm. It is preferable that the particle diameter be such a size that enables porosity to provide electrolytic solution permeability. Metal oxide particles having a larger particle diameter are more preferable in order to provide a larger voidage.

Here, for the sake of electric conductivity of the display electrode layers formed over the insulating layers, it is preferable to form flat insulating layers formed of metal oxide particles having a small particle diameter. Furthermore, not spherical metal oxide particles, but acicular, beaded, or chain-like metal oxide particles are advantageous for electrolytic solution permeability owing to their high voidage. That is, insulating layers that realize a high voidage and flatness based on a layered or composite body of these metal oxide particles are particularly advantageous.

It is preferable to use the insulating layers in combination with inorganic films. This has an effect of reducing damages to any insulating layer or electrochromic layer already formed, when forming the second display electrode 22 or the third display electrode 32 to be formed subsequently.

As the material of the inorganic films, a material containing at least ZnS is preferable. ZnS has an advantage that it can be formed to a film by sputtering speedily without damaging the electrochromic layers, etc. Examples of materials containing ZnS as a main component include ZnS—$SiO_2$, ZnS—SiC, ZnS—Si, and ZnS—Ge. A ZnS content is preferably from 50 mol % to 90 mol %, in order for crystallinity of the insulating layers when formed to be maintained in a favorable state. Hence, ZnS—$SiO_2$ (at a molar ratio of 8/2), ZnS—$SiO_2$ (at a molar ratio of 7/3), ZnS, and ZnS—ZnO—$In_2O_3$—$Ga_2O_3$ (at a molar ratio of 60/23/10/7) are more preferable.

Use of such an insulating layer material makes it possible to obtain a favorable insulation effect with a thin film, and to prevent degradation of the film strength due to multilayering and film detachment.

The thickness of the insulating layers is not particularly limited, but is preferably from 10 nm to 2 μm.

<Electrolytic Solution Layer>

In the present embodiment, the same electrolytic solution layer as in the first embodiment may be used as an electrolytic solution layer 7.

The electrolytic solution layer 7 of the present embodiment is impregnated into any of the first and second insulating layers, the first to third electrochromic layers, the first to third display electrodes, and the counter electrodes 8, or all of these across.

<White Reflection Layer>

In the present embodiment, the same white reflection layer as in the first embodiment may be used as a white reflection layer 6.

<Other Layers>

In the present embodiment, there may be other layers than those described above. Examples of other layers include a hard coat layer for preventing failures due to flaws, detachment, etc., and an AR (Anti-Reflection) coat layer for suppressing reflection.

The hard coat layer is formed by coating of a solution. Its material is not particularly limited, and a UV-curable resin, a thermosetting resin, and such common hard coat materials for optical parts may be used. Further, layers may be formed of only the hard coat material described above and an AR coat material.

(Method for Producing Electrochromic Display Device)

A method for producing the electrochromic display device of the present invention includes at least a step of forming a display electrode over a display substrate, a step of forming an yttrium-containing metal oxide layer over the display electrode, a step of forming an electrochromic layer over the yttrium-containing metal oxide layer, a step of forming a plurality of counter electrodes over a counter substrate facing the display substrate, and a step of forming an electrolytic solution layer between the display substrate and the counter substrate.

In the step of forming an yttrium-containing metal oxide layer over the display electrode, it is preferable to form a titanium oxide-containing layer over the display electrode, form an yttrium-containing metal oxide layer over the titanium oxide-containing layer, and a titanium oxide-containing layer over the yttrium-containing metal oxide layer.

According to the method for producing the electrochromic display device of the present invention, it is possible to provide an electrochromic display device production method that can suppress intra-layer and inter-layer crosstalk with a simple method.

EXAMPLES

The present invention will be described below by raising Examples and Comparative Examples. The present invention is not limited to Examples shown below.

Example 1

<Production of Electrochromic Display Device>

An electrochromic display device of Example 1 shown in FIG. 1 and FIG. 2 was produced as described below.

—Production of Display Electrode, Yttrium-Containing Metal Oxide Layer, and Electrochromic Layer—

Via a metal mask, an ITO (indium-tin-oxide) film having a thickness of 100 nm was formed by sputtering over a 40 mm×40 mm glass substrate, which was a display substrate 1, over a 20 mm×20 mm region thereof and its lead portion, to thereby produce a display electrode 2.

Next, a first titanium oxide-containing layer 10a having a thickness of 10 nm, an yttrium oxide ($Y_2O_3$) layer (with an yttrium oxide content of 100 mol %) having a thickness of 5 nm as an yttrium-containing metal oxide layer 3, and a second titanium oxide-containing layer 10b having a thickness of 10 nm were formed sequentially over the display electrode 2 by sputtering.

Next, a titanium oxide particle dispersion liquid (SP210 manufactured by Showa Titanium Co., Ltd.) was applied by spin coating over the second titanium oxide-containing layer 10b, and subjected to an anneal treatment at 120° C. for 15 minutes, to thereby form a titanium oxide particle film.

Next, a 1% by mass 2,2,3,3-tetrafluoropropanol solution of a viologen compound (4,4'-(1-phenyl-1H-pyrrole-2,5-diyl)bis(1-(4-(phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form an electrochromic layer 4 composed of titanium oxide particles and the electrochromic compound. The thickness of the electrochromic layer 4 was about 1 μm.

—Production of White Reflection Layer—

Next, a white titanium oxide particle dispersion liquid (titanium oxide particles (CR50 manufactured by Ishihara Sangyo Kaisha Ltd.): 45% by mass, a water-based polyester-based urethane resin (HW350 manufactured by DIC Corporation): 5% by mass, and 2,2,3,3-tetrafluoropropanol: 90% by mass) was applied by spin coating over the electrochromic layer 4, to form a white reflection layer 6 having a thickness of 5 μm, to thereby produce the display substrate 1.

—Production of Counter Substrate—

Via a metal mask, an ITO film having a thickness of 100 nm was formed by sputtering over a 40 mm×40 mm glass substrate, which was a counter substrate 9, over three 7 mm×15 mm regions thereof, and their respective lead portions, to thereby produce counter electrodes 8. As a protective layer, an antimony tin oxide particle dispersion liquid having an average particle diameter of 20 nm (manufactured by Mitsubishi Materials Corporation, an antimony tin oxide particle solid content concentration: 5% by mass, a water-based polyester-based urethane resin (HW350 manufactured by DIC Corporation): 5% by mass, and 2,2,3,3-tetrafluoropropanol: 90% by mass) was applied by spin coating over the counter electrodes 8, to form a protective layer having a thickness of 250 nm, to thereby produce the counter substrate 9.

—Production of Electrochromic Display Device—

An electrolytic solution was prepared by mixing tetrabutylammonium perchlorate as an electrolyte, dimethylsulfoxide and polyethylene glycol (molecular weight: 200) as solvents, and a UV-curable adhesive (PTC10 manufactured by Jujo Chemical Co., Ltd.) at a ratio of 1.2:5.4:6:16, and applied by dropping over the counter substrate 9. After this, the counter substrate 9 was overlapped with the display substrate 1, and bonded with the display substrate 1 by curing by UV irradiation from the counter substrate 9 side, to thereby produce the electrochromic display device of Example 1. The thickness of an electrolytic solution layer 7 was set to 10 μm by mixing bead spacers in the electrolytic solution layer 7 in an amount of 0.2% by mass.

Comparative Example 1

<Production of Electrochromic Display Device>

An electrochromic display device of Comparative Example 1 was produced in the same manner as in Example 1, except that the yttrium-containing metal oxide layer 3 was omitted in the manner described below.

—Production of Display Electrode and Electrochromic Layer—

Via a metal mask, an ITO film having a thickness of 100 nm was formed by sputtering over a 40 mm×40 mm glass substrate, which was a display substrate 1, over a 20 mm×20 mm region thereof and its lead portion, to thereby produce a display electrode 2.

Next, a titanium oxide particle dispersion liquid (SP210 manufactured by Showa Titanium Co., Ltd.) was applied by spin coating over the display electrode 2, and subjected to an anneal treatment at 120° C. for 15 minutes, to thereby form a titanium oxide particle film.

Next, a 1% by mass 2, 2, 3,3-tetrafluoropropanol solution of a viologen compound (4,4'-(1-phenyl-1H-pyrrole-2,5-diyl)bis(1-(4-(phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form an electrochromic layer 4 composed of titanium oxide particles and the electrochromic compound. The thickness of the electrochromic layer 4 was about 1 μm.

Comparative Example 2

<Production of Electrochromic Display Device>

An electrochromic display device of Comparative Example 2 was produced in the same manner as in Example 1, except that an yttrium-free metal oxide layer was provided in the manner described below. Note that a $ZnS$—$SiO_2$ layer was formed instead of an yttrium-containing layer 3.

—Production of Display Electrode, Metal Oxide Layer, and Electrochromic Layer—

Via a metal mask, an ITO film having a thickness of 100 nm was formed by sputtering over a 40 mm×40 mm substrate, which was a display substrate 1, over a 20 mm×20 mm region thereof and its lead portion, to thereby produce display electrode 2.

Next, a first titanium oxide-containing layer 10a having a thickness of 10 nm, a $ZnS$—$SiO_2$ layer having a thickness of 10 nm as an (yttrium-free) metal oxide layer, and a second titanium oxide-containing layer 10b having a thickness of 10 nm were sequentially formed over the display electrode 2 by sputtering. The sputtering targets used for formation of the ZnS—$SiO_2$ layer were at a composition ratio of ZnS:$SiO_2$=80 mol % 20 mol %.

Next, a titanium oxide particle dispersion liquid (SP210 manufactured by Showa Titanium Co., Ltd.) was applied by spin coating over the second titanium oxide-containing layer 10b, and subjected to an anneal treatment at 120° C. for 15 minutes, to thereby form a titanium oxide particle film.

Next, a 1% by mass 2,2,3,3-tetrafluoropropanol solution of a viologen compound (4,4'-(1-phenyl-1H-pyrrole-2,5-diyl)bis(1-(4-(phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form an electrochromic layer 4 composed of titanium oxide particles and the electrochromic compound. The thickness of the electrochromic layer 4 was about 1 μm.

Comparative Example 3

<Production of Electrochromic Display Device>

An electrochromic display device of Comparative Example 3 was produced in the same manner as in Example 1, except that an yttrium-free metal oxide layer was provided in the manner described below. Note that a $Bi_2O_3$—$B_2O_3$ layer was formed instead of an yttrium-containing metal oxide layer.

—Production of Display Electrode, Metal Oxide Layer, and Electrochromic Layer—

Via a metal mask, an ITO film having a thickness of 100 nm was formed by sputtering over a 40 mm×40 mm glass substrate, which was a display substrate 1, over a 20 mm×20 mm region thereof and its lead portion, to thereby produce a display electrode 2.

Next, a first titanium oxide-containing layer 10a having a thickness of 10 nm, a $Bi_2O_3$—$B_2O_3$ layer having a thickness of 10 nm as an (yttrium-free) metal oxide layer, and a second titanium oxide-containing layer 10b having a thickness of 10 nm were sequentially formed over the display electrode 2 by sputtering. The sputtering targets used for formation of the $Bi_2O_3$—$B_2O_3$ layer were at a composition ratio of $Bi_2O_3$:$B_2O_3$=66.6 mol % 33.4 mol %.

Next, a titanium oxide particle dispersion liquid (SP210 manufactured by Showa Titanium Co., Ltd.) was applied by spin coating over the second titanium oxide-containing layer 10b, and subjected to an anneal treatment at 120° C. for 15 minutes, to thereby form a titanium oxide particle film.

Next, a 1% by mass 2,2,3,3-tetrafluoropropanol solution of a viologen compound (4,4'-(1-phenyl-1H-pyrrole-2,5-diyl(bis(1-(4-(phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form an electrochromic layer 4 composed of titanium oxide particles and the electrochromic compound. The thickness of the electrochromic layer 4 was about 1 μm.

(Evaluation)

An electrooptical property, a display image retention property, and light resistance of the electrochromic display devices of Example 1 and Comparative Examples 1, 2, and 3 produced as above were evaluated in the manner described below.

<Evaluation of Electrooptical Property>

An electric property was evaluated according to a cyclic voltammetry (CV) method, with the display electrode 2 used as a working electrode, and one of the three counter electrodes 8 used as a reference electrode and a counter electrode. At the same time, an optical property was evaluated by measuring the intensity of reflected light having a wavelength of 550 nm.

For the measurements, an electrochemical analyzer ALS660C (manufactured by BAS (Bioanalytical Systems) Inc.) and a spectroscope USB4000 (manufactured by Ocean Optics, Inc.) were used. As for the intensity of reflected light, reflectance from a standard white board (manufactured by Japan Color Research Institute) was referenced as 100%.

The CV measurement was performed at a sweeping rate of 0.5 V/sec, and voltage-dependent reflectance change was also measured.

The result of Example 1 was shown in FIG. 4. The result of Comparative Example 1 was shown in FIG. 5. The result of Comparative Example 2 was shown in FIG. 6. The result of Comparative Example 3 was shown in FIG. 7. In the drawings, solid-line graphs represent current value, and broken-line graphs represent transmittance. Arrows point to relevant axes.

An oxidation peak potential (color fading potential) of Example 1 was +5.5 V. An oxidation peak potential of Comparative Example 1 was +0.4 V. An oxidation peak potential of Comparative Example 3 was +6.0 V. In Comparative Example 2, substantially no current that would accompany an oxidation-reduction reaction was observed, and substantially no reflectance change was observed, either. From the result, it turned out that provision of the yttrium-containing metal oxide layer 3 caused a shift in the peak of the potential at which the oxidation-reduction reaction would occur, and produced a threshold of the color developing/color fading reaction.

Further, in the case where a ZnS—$SiO_2$ layer was provided as an yttrium-free insulating metal oxide layer (Comparative Example 2), substantially no color development/fading reaction of the electrochromic layer 4 was observed. From the fact, it was indicated that the yttrium-containing metal oxide layer 3 was effective for controlling the peak potential of color development/fading.

<Display Image Retention Property>

Next, a display image retention property was evaluated in order to confirm resolution change over time. With the display electrode of each of Example 1 and Comparative Example 1 connected to a negative terminal, and one of the three counter electrodes 8 of each connected to a positive terminal, a voltage of +5 V was applied to each until a sufficient color optical density was obtained. A magenta color-developed region that reflected the shape of the selected counter electrode 8 was observed at a portion of the electrochromic layer 3 facing the selected counter electrode 8. The times taken until the reflectance of the wavelength of 550 nm from the magenta color-developed regions of the respective electrochromic display devices reached 5% were about 2 seconds in Example 1 and about 0.5 seconds in Comparative Example 1.

After this, the display electrode 2 and the counter electrode 8 was released from the connected state. Ten minutes after the release, the pattern reflecting the counter electrode 8 could be discerned in Example 1, whereas the pattern of the counter electrode 8 could not be discerned but a blurred magenta-color region remained in Comparative Example 1. The display image retention property of Example 1 was higher than that of Comparative Example 1.

<Evaluation of Light Resistance>

The electrochromic display devices produced in Example 1, and Comparative Examples 1 and 3 were subjected to a light irradiation test for 12 hours. Conditions were set such that a sample would be irradiated with light of 1,000 lux under a fluorescent lamp. After the light irradiation, no noticeable change was observed in the appearance in Example 1 and Comparative Example 1, whereas the appearance of the electrochromic display device of Comparative Example 3 was blackened. At the time, change of the reflectance of the wavelength of 550 nm was a drop from about 45% to about 30%, where reflectance from a standard white board (manufactured by Japan Color Research Institute) were referenced as 100%.

Example 2

<Production of Electrochromic Display Device>

An electrochromic display device of Example 2 shown in FIG. 3 was produced as described below.

—Production of First Display Electrode, First Yttrium-Containing Layer, and First Electrochromic Layer—

Via a metal mask, an ITO film having a thickness of 100 nm was formed by sputtering over a 40 mm×40 mm glass substrate, which was a display substrate 1, over a 20 mm×20 mm region thereof, and its lead portion, to thereby produce a first display electrode 12.

Next, a first titanium oxide-containing layer 10a having a thickness of 5 nm, an yttrium oxide ($Y_2O_3$) layer (with an yttrium oxide content of 100 mol %) having a thickness of 5 nm, which was a first yttrium-containing layer 13, and a second titanium oxide-containing layer 10b having a thickness of 5 nm were sequentially formed over the first display electrode 12 by sputtering.

Next, a titanium oxide particle dispersion liquid (SP210 manufactured by Showa Titanium Co., Ltd.) was applied by spin coating over the second titanium oxide-containing layer 10b, and subjected to an anneal treatment at 120° C. for 15 minutes, to thereby form a titanium oxide particle film.

Next, a 1% by mass 2, 2, 3,3-tetrafluoropropanol solution of a viologen compound (4,4'-(1-phenyl-1H-pyrrole-2,5-diyl)bis(1-(4-(phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form a first electrochromic layer 14 composed of titanium oxide particles and the electrochromic compound. The thickness of the electrochromic layer 14 was about 1 μm.

—Formation of First Insulating Layer—

A silica particle dispersion liquid having an average primary particle diameter of 20 nm (silica solid content concentration: 13% by mass, a polyvinyl alcohol resin (PVA500 manufactured by Japan Vam & Poval Co., Ltd.): 2% by mass, and 2,2,3,3-tetrafluoropropanol: 85% by mass) was applied by spin coating, and subjected to an anneal treatment with a hot plate set to 120° C. for 10 minutes, to thereby obtain a porous first insulating layer 15 having a thickness of about 1 μm. Further, a silica particle dispersion liquid having an average particle diameter of 450 nm (silica solid content concentration: 1% by mass, and 2-propanol: 99% by mass) was applied by spin coating. Then, ZnS—$SiO_2$ (80 mol %:20 mol %) was formed by sputtering over the applied liquid to a thickness of 100 nm, to thereby form the first insulating layer 15.

—Formation of Second Display Electrode and Second Yttrium-Containing Layer—

Further, an ITO film having a thickness of 100 nm was formed by sputtering over the first insulating layer 15, over a 20 mm×20 mm region thereof that positionally coincided with the ITO film formed as the first display electrode 12. Further, via a metal mask, a lead portion was formed at a position different from the lead portion of the first display electrode 12, to thereby obtain a second display electrode 22.

Next, a third titanium oxide-containing layer having a thickness of 10 nm, an yttrium oxide-containing layer (with an yttrium oxide content of 100 mol %) having a thickness of 10 nm, which was a second yttrium-containing layer 23, and a fourth titanium oxide-containing layer having a thickness of 10 nm were sequentially formed over the second display electrode 22 by sputtering.

Further, the resultant was irradiated with ultrasonic waves in a 2-propanol bath for 3 minutes to remove the silica particles having an average particle diameter of 450 nm dispersed before, to thereby form the second display electrode 22 having minute through holes, and the second yttrium-containing layer (with an yttrium oxide content of 100 mol %) 23. The lead portion from the first display electrode 12 and the lead portion from the second display electrode 22 had a resistance of 40 MΩ or higher, and were insulated from each other.

—Production of Second Electrochromic Layer—

A titanium oxide particle dispersion liquid (SP210 manufactured by Showa Titanium Co., Ltd.) was applied by spin coating over the fourth titanium oxide-containing layer, and subjected to an anneal treatment at 120° C. for 15 minutes, to thereby form a titanium oxide particle film. Next, a 1% by mass 2,2,3,3-tetrafluoropropanol solution of a viologen compound (4,4'-(4,4'-(1,3,4-oxadiazole-2,5-diyl)bis(4,1-phenylene)bis(1-(8-phosphonooctyl)pyridinium)bromide), which was an electrochromic compound for developing a yellow color, was applied by spin coating over the titanium oxide particle film, and subjected to an anneal treatment at 120° C. for 10 minutes, to thereby form a second electrochromic layer 24 composed of titanium oxide particles and the electrochromic compound. The thickness of the second electrochromic layer 24 was about 1 μm.

—Formation of Second Insulating Layer—

A silica particle dispersion liquid having an average primary particle diameter of 20 nm (silica solid content concentration: 13% by mass, a polyvinyl alcohol resin (PVA500 manufactured by Japan Vam & Poval Co., Ltd.): 2% by mass, and 2,2,3,3-tetrafluoropropanol: 85% by mass) was applied by spin coating, and subjected to an anneal treatment with a hot plate set to 120° C. for 10 minutes, to thereby obtain a porous second insulating layer 25 having a thickness of about 1 μm. Further, a silica particle dispersion liquid having an average particle diameter of 450 nm (silica solid content concentration: 1% by mass, and 2-propanol: 99% by mass) was applied by spin coating. Then, ZnS—$SiO_2$ (80 mol %:20 mol %) was formed by sputtering over the applied liquid to a thickness of 100 nm, to thereby form the second insulating layer 25.

—Formation of Third Display Electrode and Third Yttrium-Containing Layer—

Further, an ITO film having a thickness of 100 nm was formed by sputtering over the second insulating layer 25, over a 20 mm×20 mm region thereof that positionally coincided with the ITO films formed as the first display electrode 12 and the second display electrode 22. Further, via a metal mask, a lead portion was formed at a position different from the lead portions of the first display electrode 12 and the second display electrode 22, to thereby form a third display electrode 32. Next, a fifth titanium oxide-containing layer having a thickness of 10 nm, an yttrium oxide-containing layer (with an yttrium oxide content of 100 mol %) having a thickness of 10 nm, which was a third yttrium-containing layer 33, and a sixth titanium oxide-containing layer having a thickness of 10 nm were sequentially formed over by third display electrode 32 by sputtering.

Further, the resultant was irradiated with ultrasonic waves in a 2-propanol bath for 3 minutes to remove the silica particles having an average particle diameter of 450 nm dispersed before, to thereby form the third display electrode 32 having minute through holes, and the third yttrium-containing layer (with an yttrium oxide content of 100 mol %) 33. The lead portion from the second display electrode 22 and the lead portion from the third display electrode 32 had a resistance of 40 MΩ or higher, and were insulated from each other.

—Production of Third Electrochromic Layer—

A titanium oxide particle dispersion liquid (SP210 manufactured by Showa Titanium Co., Ltd.) was applied by spin coating over the sixth titanium oxide-containing layer, and subjected to an anneal treatment at 120° C. for 15 minutes, to thereby form a titanium oxide particle film. Next, a 1% by mass 2,2,3,3-tetrafluoropropanol solution of a viologen compound (4,4'-(isoxazole-3,5-diyl)bis(1-(2-phosphono-ethyl)pyridinium)bromide), which was an electrochromic compound for developing a cyan color, was applied by spin coating over the titanium oxide particle film, and subjected to an anneal treatment at 120° C. for 10 minutes, to thereby form a third electrochromic layer 34 composed of titanium oxide particles and the electrochromic compound. The thickness of the third electrochromic layer 34 was about 1 μm.

—Production of White Reflection Layer—

Next, a white titanium oxide particle dispersion liquid having an average primary particle diameter of 250 nm (titanium oxide particles (CR50 manufactured by Ishihara Sangyo Kaisha, Ltd.): 45% by mass, a water-based polyester-based urethane resin (HW350 manufactured by DIC Corporation): 5% by mass, and 2,2,3,3-tetrafluoropropanol: 50% by mass) was applied by spin coating over the third electrochromic layer 34 to form a white reflection layer 6, to thereby produce the display substrate 1.

—Production of Counter Substrate—

Via a metal mask, an ITO film having a thickness of 100 nm was formed by sputtering over a 40 mm×40 mm glass substrate, which was a counter substrate 9, over three 7 mm×15 mm regions thereof, and their respective lead portions, to thereby form counter electrodes 8. As a protective layer, an antimony tin oxide particle dispersion liquid having an average particle diameter of 20 nm (manufactured by Mitsubishi Materials Corporation, antimony tin oxide particle solid content concentration: 5% by mass, a water-based polyester-based urethane resin (HW350 manufactured by DIC Corporation): 5% by mass, and 2,2,3,3-tetrafluoropropanol: 90% by mass) was applied by spin coating over the counter electrodes 8, to form a protective layer having a thickness of 250 nm, to thereby produce the counter substrate 9.

—Production of Electrochromic Display Device—

An electrolytic solution was prepared by mixing tetrabutylammonium perchlorate as an electrolyte, dimethylsulfoxide and polyethylene glycol (molecular weight: 200) as solvents, and a UV-curable adhesive (PTC10 manufactured by Jujo Chemical Co., Ltd.) at a ratio of 1.2:5.4:6:16, and applied by dropping over the counter substrate 9. After this, the counter substrate 9 was overlapped with the display substrate 1, and bonded with the display substrate 1 by curing by UV irradiation from the counter substrate 9 side, to thereby produce the electrochromic display device of Example 2. The thickness of an electrolytic layer was set to 10 μm by mixing bead spacers in the electrolytic layer in an amount of 0.2% by mass.

<Evaluation>

A color development property of the electrochromic display device of Example 2 produced as above was evaluated in the manner described below.

<<Color Development Test>>

With one of the three counter electrodes 8 connected to a positive terminal, and the first display electrode 12 connected to a negative terminal, a voltage of +6 V was applied with a constant-voltage power supply for 0.5 seconds until a sufficient color optical density was obtained. As a result, a magenta color region that reflected the shape of the selected counter electrode was observed in the electrochromic layer.

Then, with one counter electrode 8 different from the counter electrode 8 selected before connected to a positive terminal, and the second display electrode 22 connected to a negative terminal, a voltage of +6 V was applied with a constant-voltage power supply for 0.5 seconds. A yellow color region that reflected the shape of the selected counter electrode was observed. At the time, there was no change in the magenta color region that had developed before.

Then, with the remaining one counter electrode 8 connected to a positive terminal, and the third display electrode 32 connected to a negative terminal, a voltage of +6 V was applied with a constant-voltage power supply for 0.5 seconds. A cyan color region that reflected the shape of the selected counter electrode 8 was observed. At the time, there was substantially no change in the magenta and yellow color regions that had developed before.

Even one minute after the third display electrode 32 was released from the connected state, the respective magenta, yellow, and cyan color regions remained without being mixed with each other.

Comparative Example 4

<Production of Electrochromic Display Device>

An electrochromic display device of Comparative Example 3 was produced in the same manner as in Example 2, except that an yttrium-containing metal oxide layer was omitted in the manner described below.

—Production of First Display Electrode and First Electrochromic Layer—

Via a metal mask, an ITO film having a thickness of 100 nm was formed by sputtering over a 40 mm×40 mm glass substrate, which was a display substrate 1, over a 20 mm×20 mm region thereof, and its lead portion, to thereby produce a first display electrode 12.

Next, a titanium oxide particle dispersion liquid (SP210 manufactured by Showa Titanium Co., Ltd.) was applied by spin coating over the first display electrode 12, and subjected to an anneal treatment at 120° C. for 15 minutes, to thereby form a titanium oxide particle film.

Next, a 1% by mass 2,2,3,3-tetrafluoropropanol solution of a viologen compound (4,4'-(1-phenyl-1H-pyrrole-2,5-diyl)bis(1-(4-(phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form a first electrochromic layer 14 composed of titanium oxide particles and the electrochromic compound. The thickness of the first electrochromic layer 14 was about 1 µm.

—Formation of Second Display Electrode—

An ITO film having a thickness of 100 nm was formed by sputtering over a first insulating layer 15, over a 20 mm×20 mm region thereof that positionally coincided with the ITO film formed as the first display electrode 12. Further, via a metal mask, a lead portion was formed at a position different from the lead portion of the first display electrode 12, to thereby obtain a second display electrode 22.

Further, the resultant was irradiated with ultrasonic waves in a 2-propanol bath for 3 minutes to remove silica particles having an average particle diameter of 450 nm dispersed before, to thereby form the second display electrode 22 having minute through holes. The lead portion from the first display electrode 12 and the lead portion from the second display electrode 22 had a resistance of 40 MΩ or higher, and were insulated from each other.

—Production of Second Electrochromic Layer—

A titanium oxide particle dispersion liquid (SP210 manufactured by Showa Titanium Co., Ltd.) was applied by spin coating over the second display electrode 22, and subjected to an anneal treatment at 120° C. for 15 minutes, to thereby form a titanium oxide particle film.

Next, a 1% by mass 2,2,3,3-tetrafluoropropanol solution of a viologen compound (4,4'-(4,4'-(1,3,4-oxadiazole-2,5-diyl)bis(4,1-phenylene))bis(1-(8-phosphonooctyl)pyridinium)bromide), which was an electrochromic compound for developing a yellow color, was applied by spin coating over the titanium oxide particle film, and subjected to an anneal treatment at 120° C. for 10 minutes, to thereby form a second electrochromic layer 24 composed of titanium oxide particles and the electrochromic compound. The thickness of the second electrochromic layer 24 was about 1 µm.

—Formation of Third Display Electrode—

Further, an ITO film having a thickness of 100 nm was formed by sputtering over a second insulating layer 25, over a 20 mm×20 mm region thereof that positionally coincided with the ITO films formed as the first display electrode 12 and the second display electrode 22. Further, via a metal mask, a lead portion was formed at a position different from the lead portions of the first display electrode 12 and the second display electrode 22, to thereby obtain a third display electrode 32. Further, the resultant was irradiated with ultrasonic waves in a 2-propanol bath for 3 minutes to remove silica particles having an average particle diameter of 450 nm dispersed before, to thereby form the third display electrode 32 having minute through holes. The lead portion from the second display electrode 22 and the lead portion from the third display electrode 32 had a resistance of 40 MΩ or higher, and were insulated from each other.

—Production of Third Electrochromic Layer—

A titanium oxide particle dispersion liquid (SP210 manufactured by Showa Titanium Co., Ltd.) was applied by spin coating over the third display electrode 32, and subjected to an anneal treatment at 120° C. for 15 minutes, to thereby form a titanium oxide particle film.

Next, a 1% by mass 2,2,3,3-tetrafluoropropanol solution of a viologen compound (4,4'-(isoxazole-3,5-diyl)bis(1-(2-phosphonoethyl)pyridinium)bromide), which was an electrochromic compound for developing a cyan color, was applied by spin coating over the titanium oxide particle film, and subjected to an anneal treatment at 120° C. for 10 minutes, to thereby form a third electrochromic layer 34 composed of titanium oxide particles and the electrochromic compound. The thickness of the third electrochromic layer 34 was about 1 µm.

<Evaluation>

A color development property of the electrochromic display device of Comparative Example 4 produced as above was evaluated in the manner described below.

<<Color Development Test>>

With one of the three counter electrodes 8 connected to a positive terminal, and the first display electrode connected to a negative electrode, a voltage of +6 V was applied with a constant-voltage power supply for 0.5 seconds until a sufficient color optical density was obtained. As a result, a magenta color region that reflected the shape of the selected counter electrode 8 was observed in the first electrochromic layer 14.

Then, with one counter electrode 8 different from the counter electrode 8 selected before connected to a positive terminal, and the second display electrode 22 connected to a negative terminal, a voltage of +6 V was applied with a constant-voltage power supply for 0.5 seconds. A yellow color region that reflected the shape of the selected counter electrode 8 was observed. At the time, yellow color development was observed in the magenta color region that had developed before, which hence had changed to a red color.

Then, with the remaining one counter electrode 8 connected to a positive terminal, and the third display electrode 32 connected to a negative terminal, a voltage of +6 V was applied with a constant-voltage power supply for 0.5 seconds. A cyan color region that reflected the shape of the selected counter electrode 8 was observed. At the time, cyan color development was also observed in the magenta color region that had developed before, which hence had changed to a black color.

Furthermore, magenta color development and cyan color development were observed in the yellow color region that had developed before, which hence had also changed to a black color.

One minute after the third display electrode 32 was released from the connected state, the magenta, yellow, and cyan color regions had changed to a black color likewise. A display image retention property of Comparative Example 4 was poorer by far than that of Example 2, and magenta, yellow, and cyan colors could not be displayed simultaneously.

Example 3

<Production of Electrochromic Display Device>

An electrochromic display device of Example 3 was produced as described below in the same manner as in Example 2, except that a drive substrate including 3.5-inch active-matrix TFTs was used instead of the counter electrodes 8 and counter substrate 9 of Example 2, and the size of the display substrate 1, the first display electrode 12, the second display electrode 22, and the third display electrode 32 was changed from Example 2. The drive substrate used included 3.5-inch low-temperature polysilicon TFTs for QVGA. The pixel size was 223.6 μm×223.6 μm.

—Formation of First Display Electrode and First Electrochromic Layer—

A 90 mm×90 mm glass substrate was used as a display substrate 1. Via a metal mask, an ITO film having a thickness of 100 nm was formed by sputtering over the display substrate 1, over a 75 mm×60 mm region thereof, and its lead portion, to thereby produce a first display electrode 12.

Next, a first titanium oxide-containing layer 10a having a thickness of 10 nm, an yttrium oxide-containing layer having a thickness of 5 nm (with an yttrium oxide content of 100 mol %), which was a first yttrium-containing layer 13, and a second titanium oxide-containing layer 10b having a thickness of 10 nm were sequentially formed over the first display electrode 12 by sputtering in a manner to cover the first display electrode 12.

Next, a titanium oxide particle dispersion liquid (SP210 manufactured by Showa Titanium Co., Ltd.) was applied by spin coating over the second titanium oxide-containing layer 10b, and subjected to an anneal treatment at 120° C. for 15 minutes, to thereby form a titanium oxide particle film.

Next, a 1% by mass 2,2,3,3-tetrafluoropropanol solution of a viologen compound (4,4'-(1-phenyl-1H-pyrrole-2,5-diyl)bis(1-(4-phosphonomethyl)benzyl)pyridinium)bromide), which was an electrochromic compound for developing a magenta color, was applied by spin coating over the titanium oxide particle film, and subjected to an anneal treatment at 120° C. for 10 minutes, to thereby form a first electrochromic layer 14 composed of titanium oxide particles and the electrochromic compound.

—Formation of First Insulating Layer—

A silica particle dispersion liquid having an average primary particle diameter of 20 nm (silica solid content concentration: 13% by mass, a polyvinyl alcohol resin (PVA500 manufactured by Japan Vam & Poval Co., Ltd.): 2% by mass, and 2,2,3,3-tetrafluoropropanol: 85% by mass) was applied by spin coating, and subjected to an anneal treatment with a hot plate set to 120° C. for 10 minutes, to thereby obtain a porous first insulating layer 15 having a thickness of about 1 μm. Further, a silica particle dispersion liquid having an average particle diameter of 450 nm (silica solid content concentration: 1% by mass, and 2-propanol: 99% by mass) was applied by spin coating. Then, ZnS—SiO$_2$ (80 mol % 20 mol %) was formed by sputtering over the applied liquid to a thickness of 100 nm, to thereby form the first insulating layer 15.

—Formation of Second Display Electrode, Second Yttrium-Containing Layer, and Second Electrochromic Layer—

Further, an ITO film having a thickness of 100 nm was formed by sputtering over the first insulating layer 15, over a 75 mm×60 mm region thereof that positionally coincided with the ITO film formed as the first display electrode 12. Further, via a metal mask, a lead portion was formed at a position different from the lead portion of the first display electrode 12, to thereby obtain a second display electrode 22.

Next, a third titanium oxide-containing layer having a thickness of 10 nm, an yttrium oxide-containing layer having a thickness of 10 nm (with an yttrium oxide content of 100 mol %), which was a second yttrium-containing layer 23, and a fourth titanium oxide-containing layer having a thickness of 10 nm were sequentially formed over the second display electrode 22 by sputtering in a manner to cover the second display electrode 22.

Further, the resultant was irradiated with ultrasonic waves in a 2-propanol bath for 3 minutes to remove the silica particles having an average particle diameter of 450 nm dispersed before, to thereby form the second display electrode 22 having minute through holes, and the second yttrium-containing layer (with an yttrium oxide content of 100 mol %) 23. Next, a titanium oxide particle dispersion liquid (SP210 manufactured by Showa Titanium Co., Ltd.) was applied over the resultant by spin coating, and subjected to an anneal treatment at 120° C. for 15 minutes, to thereby form a titanium oxide particle film.

Next, a 1% by mass 2,2,3,3-tetrafluoropropanol solution of a viologen compound (4,4'-(4,4'-(1,3,4-oxadiazole-2,5-diyl)bis(4,1-phenylene)bis(1-(8-phosphonooctyl)pyridinium)bromide), which was an electrochromic compound for developing a yellow color, was applied by spin coating over the titanium oxide particle film, and subjected to an anneal treatment at 120° C. for 10 minutes, to thereby form a second electrochromic layer 24 composed of titanium oxide particles and the electrochromic compound.

—Formation of Second Insulating Layer—

A silica particle dispersion liquid having an average primary particle diameter of 20 nm (silica solid content concentration: 13% by mass, a polyvinyl alcohol resin (PVA500 manufactured by Japan Vam & Poval Co., Ltd.): 2% by mass, and 2,2,3,3-tetrafluoropropanol: 85% by mass) was applied by spin coating, and subjected to an anneal treatment with a hot plate set to 120° C. for 10 minutes, to thereby obtain a porous second insulating layer 25 having a thickness of about 1 μm. Further, a silica particle dispersion liquid having an average particle diameter of 450 nm (silica solid content concentration: 1% by mass, and 2-propanol: 99% by mass) was applied by spin coating. Then, ZnS—SiO$_2$ (80 mol %: 20 mol %) was formed by sputtering over the applied liquid to a thickness of 100 nm, to thereby form the second insulating layer 25.

—Formation of Third Display Electrode, Third Yttrium-Containing Layer, and Third Electrochromic Layer—

Next, an ITO film having a thickness of 100 nm was formed by sputtering over the second insulating layer 25, over a 75 mm×60 mm region thereof that positionally coincided with the ITO film formed as the second display electrode 22. Further, via a metal mask, a lead portion was formed at a position different from the lead portions of the first display electrode 12 and the second display electrode 22, to thereby obtain a third display electrode 32.

Next, a fifth titanium oxide-containing layer having a thickness of 10 nm, an yttrium oxide-containing layer having a thickness of 10 nm (with an yttrium oxide content of 100 mol %), which was a third yttrium-containing layer 33, and a sixth titanium oxide-containing layer having a thickness of 10 nm were sequentially formed over the third display electrode 32 by sputtering in a manner to cover the third display electrode 32.

Further, the resultant was irradiated with ultrasonic waves in a 2-propanol bath for 3 minutes to remove the silica particles having an average particle diameter of 450 nm dispersed before, to thereby form the third display electrode 32 having minute through holes, and the third yttrium-containing layer (with an yttrium oxide content of 100 mol %) 33. Next, a titanium oxide particle dispersion liquid (SP210 manufactured by Showa Titanium Co., Ltd.) was applied over the resultant by spin coating, and subjected to an anneal treatment at 120° C. for 15 minutes, to thereby form a titanium oxide particle film.

Next, a 1% by mass 2,2,3,3-tetrafluoropropanol solution of a viologen compound (4,4'-(isoxazole-3,5-diyl)bis(1-(2-phosphonoethyl)pyridinium)bromide), which was an electrochromic compound for developing a cyan color, was applied by spin coating over the titanium oxide particle film, and subjected to an anneal treatment at 120° C. for 10 minutes, to thereby form a third electrochromic layer 34 composed of titanium oxide particles and the electrochromic compound.

—Production of White Reflection Layer—

Next, a white titanium oxide particle liquid having an average primary particle diameter of 250 nm (titanium oxide particles (CR50 manufactured by Ishihara Sangyo Kaisha, Ltd.): 45% by mass, a water-based polyester-based urethane resin (HW350 manufactured by DIC Corporation): 5% by mass, and 2,2,3,3-tetrafluoropropanol: 50% by mass) was applied by spin coating over the third electrochromic layer 34 to form a white reflection layer 6 having a thickness of 5 μm, to thereby produce the display substrate 1.

—Production of Counter Substrate—

As a protective layer, an antimony tin oxide particle dispersion liquid having an average particle diameter of 20 nm (manufactured by Mitsubishi Materials Corporation, an antimony tin oxide particle solid content concentration: 5% by mass, a water-based polyester-based urethane resin (HW350 manufactured by DIC Corporation): 5% by mass, and 2,2,3,3-tetrafluoropropanol: 90% by mass) was applied by spin coating over a pixel electrode region of a 3.5-inch low-temperature polysilicon TFT substrate for QVGA, which was a counter electrode 9, to form a protective layer having a thickness of 250 nm, to thereby produce the counter substrate 9.

—Production of Electrochromic Display Device—

An electrolytic solution was prepared by mixing tetrabutylammonium perchlorate as an electrolyte, dimethylsulfoxide and polyethylene glycol (molecular weight: 200) as solvents, and a UV-curable adhesive (PTC10 manufactured by Jujo Chemical Co., Ltd.) at a ratio of 1.2:5.4:6:16, and applied by dropping over the counter substrate 9. After this, the counter substrate 9 was overlapped with the display substrate 1, and bonded with the display substrate 1 by curing by UV irradiation from the counter substrate 9 side, to thereby produce the electrochromic display device of Example 3. The thickness of an electrolytic solution layer 7 was set to 10 μm by mixing bead spacers in the electrolytic solution layer 7 in an amount of 0.2% by mass.

<Evaluation>

A color development test of the electrochromic display device of Example 3 produced as above was performed in the manner described below.

<<Color Development Test>>

The electrochromic display device of Example 3 produced as above was connected to a TFT driver mounted with an FPGA (field-programmable gate array) and to a personal computer, and the following color development test was performed.

In order for a magenta color to be developed in a 8.9-mm² region, the TFTs were actuated to apply voltages to the pixel electrodes within the corresponding region and to the first display electrode 12. In about 1 second, a magenta color was developed in the corresponding region.

Further, in order for a yellow color to be developed in another 8.9-mm² region that partially overlapped the aforementioned region, the TFTs were actuated to apply voltages to the pixel electrodes within the corresponding region and to the second display electrode 22. In about 1.2 seconds, a yellow color was developed in the corresponding region. A red color was developed in the overlapping region.

Furthermore, in order for a cyan color to be developed in yet another 8.9-mm² region that partially overlapped the magenta- and yellow-displayed regions, the TFTs were actuated to apply voltages to the pixel electrodes within the corresponding region and to the third display electrode 32. In about 1 second, a cyan color was developed in the corresponding region. A blue color region was developed in the region overlapping the magenta color, a green color region was developed in the region overlapping the yellow color, and a black color region was developed in the region overlapping the red color.

Even after one minute passed, the displayed images were retained substantially as they were at the time immediately after the colors were developed.

Aspects of the present invention are as follows, for example.

<1> An electrochromic display device, including:
a pair of electrodes facing each other:
an electrochromic layer provided to one of the pair of electrodes; and
an electrolytic solution layer provided between the electrodes facing each other,
wherein the electrochromic display device includes a metal oxide layer that contains yttrium, and the metal oxide layer is between the electrochromic layer and the electrode to which the electrochromic layer is provided.

<2> The electrochromic display device according to <1>,
wherein one of the pair of electrodes is composed of a display substrate and a display electrode provided over the display substrate, and the other of the pair of electrodes is composed of: a counter substrate provided to face the display substrate; and a counter electrode provided over the counter substrate.

<3> The electrochromic display device according to <1> or <2>,
wherein the metal oxide layer that contains yttrium contains at least yttrium oxide.

<4> The electrochromic display device according to <3>,
wherein a content of the yttrium oxide in the metal oxide layer is 10 mol % or higher.

<5> An electrochromic display device, including:
a display substrate;
a plurality of display electrodes provided over the display substrate and provided over different planes respectively;
a plurality of electrochromic layers provided over the plurality of display electrodes respectively;
a counter substrate provided to face the display substrate;
counter electrodes provided over the counter substrate; and
an electrolytic solution layer provided between the display substrate and the counter substrate,
wherein the electrochromic display device includes a metal oxide layer that contains yttrium, and the metal oxide layer is at at least one portion between the plurality of display electrodes and the plurality of electrochromic layers.

<6> The electrochromic display device according to <5>,
wherein the metal oxide layer that contains yttrium contains at least yttrium oxide.

<7> The electrochromic display device according to <6>,
wherein a content of the yttrium oxide in the metal oxide layer is 10 mol % or higher.

<8> The electrochromic display device according to any one of <5> to <7>,
wherein insulating layers are provided between the plurality of display electrodes and the counter electrodes respectively.

<9> The electrochromic display device according to any one of <5> to <8>,
wherein the display electrodes and the electrochromic layers have porosity and an optical transmission property.

<10> The electrochromic display device according to <8>,
wherein the insulating layers have porosity and an optical transmission property.

<11> The electrochromic display device according to any one of <1> to <10>,
wherein the metal oxide layer that contains yttrium is formed between a titanium oxide-containing layer and a titanium oxide-containing layer.

<12> The electrochromic display device according to any one of <2> to <11>,
wherein the counter substrate and the counter electrode are composed of a matrix display substrate over which a pixel electrode and a drive circuit are formed.

REFERENCE SIGNS LIST 1 display substrate
2 display electrode
3 yttrium-containing layer
4 electrochromic layer
6 white reflection layer
7 electrolytic solution layer
8 counter electrode
9 counter substrate
10a, 10b titanium oxide-containing layer
12 first display electrode
13 first yttrium-containing layer
14 first electrochromic layer
15 first insulating layer
22 second display electrode
23 second yttrium-containing layer
24 second electrochromic layer
25 second insulating layer
32 third display electrode
33 third yttrium-containing layer
34 third electrochromic layer

The invention claimed is:

1. An electrochromic display device, comprising:
a pair of electrodes facing each other:
an electrochromic layer provided to one of the pair of electrodes; and
an electrolytic solution layer provided between the electrodes facing each other,
wherein the electrochromic display device comprises a metal oxide layer that comprises yttrium, wherein the metal oxide layer is between the electrochromic layer and the electrode to which the electrochromic layer is provided.

2. The electrochromic display device according to claim 1,
wherein one of the pair of electrodes is composed of a display substrate and a display electrode provided over the display substrate, and the other of the pair of electrodes is composed of: a counter substrate provided to face the display substrate; and a counter electrode provided over the counter substrate.

3. The electrochromic display device according to claim 2,
wherein the counter substrate and the counter electrode are composed of a matrix display substrate over which a pixel electrode and a drive circuit are formed.

4. The electrochromic display device according to claim 1, wherein the metal oxide layer that comprises yttrium comprises yttrium oxide.

5. The electrochromic display device according to claim 4,
wherein a content of the yttrium oxide in the metal oxide layer is 10 mol % or higher.

6. The electrochromic display device according to claim 1,
wherein the metal oxide layer that comprises yttrium is formed between a layer that comprises titanium oxide and a layer that comprises titanium oxide.

7. An electrochromic display device, comprising:
a display substrate;
a plurality of display electrodes provided over the display substrate and provided over different planes respectively;
a plurality of electrochromic layers provided over the plurality of display electrodes respectively;
a counter substrate provided to face the display substrate;
counter electrodes provided over the counter substrate; and
an electrolytic solution layer provided between the display substrate and the counter substrate,
wherein the electrochromic display device comprises a metal oxide layer that comprises yttrium, and wherein the metal oxide layer is at at least one portion between the plurality of display electrodes and the plurality of electrochromic layers.

8. The electrochromic display device according to claim 7,
wherein the metal oxide layer that comprises yttrium comprises yttrium oxide.

9. The electrochromic display device according to claim 8,
wherein a content of the yttrium oxide in the metal oxide layer is 10 mol % or higher.

10. The electrochromic display device according to claim 7,
wherein insulating layers are provided between the plurality of display electrodes and the counter electrodes, respectively.

11. The electrochromic display device according to claim 10,
wherein the insulating layers have porosity and an optical transmission property.

12. The electrochromic display device according to claim 7,
wherein the display electrodes and the electrochromic layers have porosity and an optical transmission property.

* * * * *